US006797406B2

(12) United States Patent
Matsudate et al.

(10) Patent No.: US 6,797,406 B2
(45) Date of Patent: Sep. 28, 2004

(54) COMPOSITE GRADIENT ALLOY PLATE, MANUFACTURING METHOD THEREOF AND COLOR CATHODE RAY TUBE HAVING SHADOW MASK USING THE COMPOSITE GRADIENT ALLOY PLATE

(75) Inventors: Noriharu Matsudate, Kujuukuri (JP); Nobuhiko Hosotani, Mobara (JP)

(73) Assignee: Hitachi, Ltd., Tokyo (JP)

( * ) Notice: Subject to any disclaimer, the term of this patent is extended or adjusted under 35 U.S.C. 154(b) by 225 days.

(21) Appl. No.: 10/162,734

(22) Filed: Jun. 5, 2002

(65) Prior Publication Data

US 2003/0006685 A1 Jan. 9, 2003

(30) Foreign Application Priority Data

Jun. 11, 2001 (JP) ....................................... 2001-176097
Dec. 10, 2001 (JP) ....................................... 2001-376139

(51) Int. Cl.$^{7}$ .......................... B32B 15/18; H01J 29/07; C21D 9/00; B21B 1/06

(52) U.S. Cl. ....................... 428/610; 428/635; 428/679; 428/680; 428/682; 428/685; 148/529; 228/193; 228/235.3; 164/90

(58) Field of Search ................................. 428/610, 635, 428/680, 679, 941, 940, 685, 686, 682; 148/529, 530, 534; 228/193, 190, 231, 235.2, 235.3; 164/90

(56) References Cited

U.S. PATENT DOCUMENTS 3,295,935 A * 1/1967 Pflumm et al. ............. 428/635
3,646,591 A * 2/1972 Thomas et al. ............. 228/197
3,782,926 A * 1/1974 Kirkpatrick et al. ........ 420/129
4,191,599 A * 3/1980 Stickels et al. ............. 148/233
4,197,360 A * 4/1980 Throop ........................ 428/651
5,156,923 A * 10/1992 Jha et al. .................... 428/614
5,358,795 A * 10/1994 Nakamura et al. .......... 428/614
5,498,383 A * 3/1996 Marple et al. ................ 264/87
6,650,035 B2 * 11/2003 Matsudate .................. 313/402
2002/0079815 A1 * 6/2002 Matsudate .................. 313/408

* cited by examiner

*Primary Examiner*—John J. Zimmerman
(74) *Attorney, Agent, or Firm*—Milbank, Tweed, Hadley & McCloy LLP

(57) ABSTRACT

The present invention relates to a color cathode ray tube provided with a pressed-type shadow mask. As material for constituting the shadow mask 6, a single plate body made of a composite gradient alloy plate consisting of three layers 6A, 6B, 6C or more in which an alloy element has the concentration gradient which is continuously changed from one surface to the other surface is used. The present invention can realize a pressed mask having a large radius of curvature by self-correcting the thermal deformation such as a doming or the like.

13 Claims, 17 Drawing Sheets

FIG. 12A
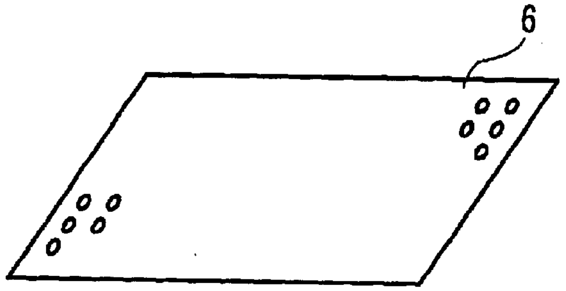
PERFORM HEAT TREATMENT OF MASK ORIGINAL PLATE TO STORE INTERNAL STRESS IN ORIGINAL PLATE
FIG. 12B
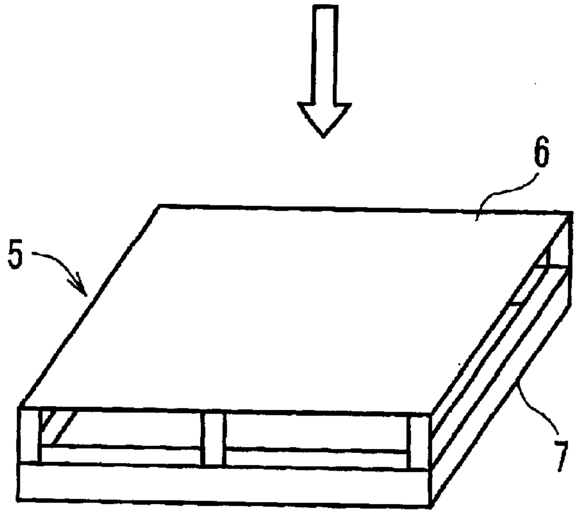
SECURE MASK ORIGINAL PLATE WHICH HAS BEEN SUBJECTED TO HEAT TREATMENT TO FRAME
FIG. 12C
TRANSFER MASK ORIGINAL PLATE TO GENERAL CRT MANUFACTURING PROCESS FIG. 13A
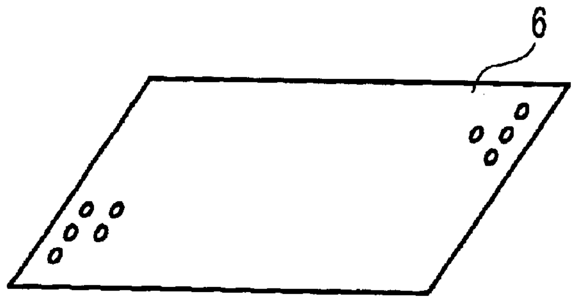
PREPARE MASK ORIGINAL PLATE WHICH IS NOT SUBJECTED TO HEAT TREATMENT
↓
FIG. 13B
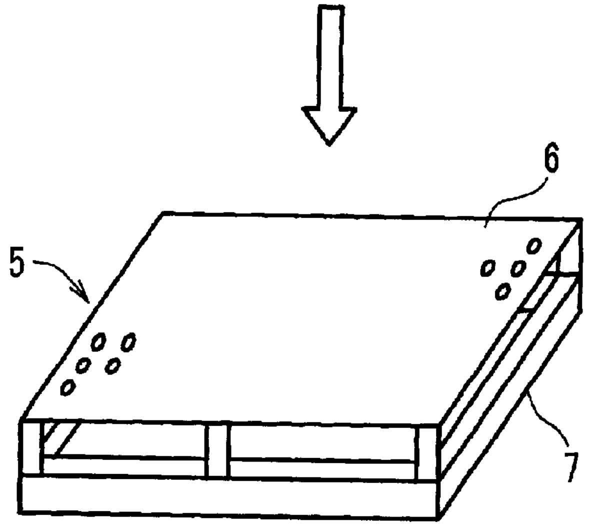
SECURE MASK ORIGINAL PLATE WHICH IS NOT SUBJECTED TO HEAT TREATMENT TO FRAME
↓
FIG. 13C
TRANSFER MASK ORIGINAL PLATE TO GENERAL CRT MANUFACTURING PROCESS
| |
|---|
| STORE INTERNAL STRESS IN THE INSIDE OF MASK BY PERFORMING HEAT TREATMENT OF MASK IN CRT MANUFACTURING PROCESS |

COMPOSITE GRADIENT ALLOY PLATE, MANUFACTURING METHOD THEREOF AND COLOR CATHODE RAY TUBE HAVING SHADOW MASK USING THE COMPOSITE GRADIENT ALLOY PLATE

BACKGROUND OF THE INVENTION

The present invention relates to a composite gradient alloy plate, a manufacturing method thereof and a highly reliable color cathode ray tube which can enhance the material strength (rigidity) of a shadow mask which constitutes a color selection electrode, can improve the etching characteristic and formability, and can decrease the thermal deformation.

With respect to color cathode ray tubes which are used as monitor devices for information equipment or display means of color picture receivers of recent years, a flat face technique which makes a panel (face panel) constituting an image display surface flat has been rapidly spreading. Particularly, when a shadow mask of a press forming type (pressed mask) which has an apertured surface thereof curved in the horizontal direction and in the vertical direction is adopted, the panel of the color cathode ray tube (flat-face tube) having the flat face has an approximately planar outer surface and an inner surface which has a curvature considerably larger than that of the outer surface.

Not only the shadow mask of a color cathode ray tube, but also a large number of plate materials among plate materials for vehicles, air planes and other structures and parts are required to meet a demand for high rigidity. As the above-mentioned shadow mask or plate material, a high rigidity plate material formed of a single plate material or a so-called clad plate material which is formed by mechanically laminating a plurality of metal plates (mainly made of iron or iron alloy) having different physical characteristics has been used conventionally. However, such a plate material per se has a little ability to hold an internal stress which can cope with a temperature change and hence, it has been difficult for the plate material to reliably ensure the shape holding ability by itself when the plate material is made thin.

In selecting the material of the plate body, it has been often a case that the selection is restricted due to material characteristics such as the strength of a product, a plate thickness, formability, stress applying means and the like. Particularly, as one technical task to be solved at the time of designing the above-mentioned flat face tube, the strength of the shadow mask is named. Here, although the explanation will be made using the shadow mask as an example, the same goes for the plate material which is applied to the above-mentioned other products. Although the shadow mask is formed with a curvature which approximates the curvature of the inner surface of the panel, the flat face tube has the small curvature of inner surface of the panel compared with a round face tube which has both of inner and outer surfaces thereof curved and hence, there is no other way but to make the curvature of the shadow mask of the flat face tube also small.

Accordingly, it is difficult to maintain the strength against the partial thermal deformation of an apertured region of the shadow mask or the thermal deformation of the whole shadow mask generated by the elevation of the temperature of the shadow mask upon impingement of electron beams in operation, that is, the strength against a so-called doming phenomenon. Further, it is also difficult for the shadow mask to maintain the physical strength thereof against a fall, a shock and the like.

As the material which ensures the strength of the shadow mask of this type, cobalt-doped Invar material which is produced by doping cobalt in conventional Invar material has been used. Although aluminum killed steel material was used as the shadow mask material (base material), Invar material has been used along with efforts to enhance the definition of the images and to make the screen have a more flattened face.

The cobalt-added Invar material which is used for enhancing the strength of the shadow mask increases the strength by approximately 20% compared with the usual Invar material and can suppress the above-mentioned deformation of the shadow mask. However, the shadow mask produced by doping cobalt in the Invar material has several defects including (1) the cost is pushed up since the cobalt is expensive, (2) the etching efficiency is decreased since the erosion resistance of cobalt is favorable, (3) the workability is decreased and (4) the magnetic characteristics are decreased.

SUMMARY OF THE INVENTION

Accordingly, it is an object of the present invention to provide a flat-face type color cathode ray tube having a shadow mask which can decrease drawbacks which such a conventional shadow mask suffers from.

A typical gist of the present invention to achieve the above-mentioned object lies in that a shadow mask material which is served for a color cathode ray tube is made of an iron material which is formed of a plate body of iron alloy having three or more layers which differ in the concentration of an alloy element and has a concentration gradient of the content of the alloy element contained in the plate body which is continuously changed at boundary portions of respective layers of the plate body and in the vicinity of the boundaries. Typical ones out of the constitutions of the present invention are described as follows.

First of all, with respect to a composite gradient alloy plate and a method for manufacturing the plate of the present invention, following constitutions are considered.

(1) In a composite gradient alloy plate having a plurality of constituent layers which are laminated while continuously changing the concentration of an alloy element in an iron-alloy plate containing the alloy element in iron in the thickness direction of the iron-alloy plate, a tensile stress and a compressive stress which remain in the planer direction of the composite gradient alloy plate at boundary regions of the plurality of constituent layers are directed in opposite directions from each other.

(2) With respect to the constitution (1), the plurality of constituent layers are formed of three layers consisting of one surface layer, the other surface layer and one intermediate layer which is laminated between one surface layer and the other surface layer.

(3) With respect to the constitution (2), the tensile stress remains in one surface layer and the other surface layer, while the compressive stress remains in one intermediate layer.

(4) With respect to the constitution (2), the compressive stress remains in one surface layer and the other surface layer, while the tensile stress remains in one intermediate layer.

(5) With respect to the constitution (2) or (3), the concentration distribution of the alloy element in the planer direction differs from each other among the plurality of constituent layers.

(6) With respect to any one of preceding constitutions (1) to (5), the concentration distribution of the alloy element in the planer direction in one surface layer is approximately equal to the concentration distribution of the alloy element in the planer direction in the other surface layer.

(7) With respect to any one of preceding constitutions (1) to (5), the alloy element is nickel.

(8) In a method for manufacturing a composite gradient alloy plate having a plurality of constituent layers which are laminated while continuously changing the concentration of an alloy element in an iron-alloy plate containing the alloy element in iron in the thickness direction of the iron-alloy plate, the method comprises:

a step in which a plurality of molten materials which differ in the content concentration of the alloy element are merged by hot rolling thus forming a base material for composite gradient alloy plate having a plurality of constituent layers which differ in thermal expansion due to the continuous change of the concentration of the alloy element, a heating step in which the temperature of the base material for composite gradient alloy plate is elevated from a normal temperature to a temperature at which the constituent layer of high thermal expansion among the plurality of constituent layers is displaced by an amount equal to or more than an elastic limit of the constituent layer of low thermal expansion thus alleviating an internal stress of the constituent layer of low thermal expansion, and a step in which, after completing the heating, the temperature of the base material for composite gradient alloy plate is made to return to the normal temperature so as to make the constituent layer of low thermal expansion generate a compressive stress and also to make the constituent layer of high thermal expansion generate a tensile stress based on the compressive stress generated in the constituent layer of low thermal expansion, whereby the internal stress is made to remain in the base material for composite gradient alloy plate.

(9) With respect to the constitution (8), the plurality of constituent layers are formed of three layers consisting of one surface layer, the other surface layer, and one intermediate layer which is laminated between one surface layer and the other surface layer.

(10) With respect to the constitution (9), one surface layer and the other surface layer are formed of high expansion layers and one intermediate layer is formed of a low expansion layer.

(11) With respect to the constitution (9), one surface layer and the other surface layer are formed of low expansion layers and one intermediate layer is formed of a high expansion layer.

(12) With respect to any one of preceding constitutions (8) to (11), the plurality of constituent layers differ in the thermal expansion coefficient in the planer direction from each other.

(13) With respect to any one of preceding constitutions (8) to (12), the thermal expansion coefficient of one surface layer in the planer direction is approximately equal to the thermal expansion coefficient of the other surface layer in the planer direction.

(14) With respect to any one of preceding constitutions (8) to (13), the alloy element is nickel.

Then, with respect to a color cathode ray tube, following constitutions are considered.

(15) In a color cathode ray tube having an evacuated envelope which includes a panel which is coated with phosphor of a plurality of colors on an inner surface thereof, a neck which houses an electron gun and a funnel which connects the panel and the neck and a shadow mask which is installed close to the phosphor coated on the inner surface of the panel and has a large number of color selection apertures, wherein the shadow mask is constituted of an iron alloy plate which contains iron as a major component and also contains an alloy element, the concentration of the alloy element is continuously changed in the plate thickness direction of the iron alloy plate, and the thermal expansion of the iron alloy plate is set lower at an intermediate portion than at respective surface portions in the plate thickness direction of the iron alloy plate.

(16) In a color cathode ray tube having an evacuated envelope which includes a panel which is coated with phosphor of a plurality of colors on an inner surface thereof, a neck which houses an electron gun and a funnel which connects the panel and the neck and a shadow mask which is installed close to the phosphor coated on the inner surface of the panel and has a large number of color selection apertures, wherein the shadow mask is constituted of an iron alloy plate which contains iron as a major component and also contains an alloy element, and the concentration of the alloy element is continuously changed in the planer direction of the iron alloy plate.

Due to the above-mentioned respective constitutions, following advantageous effects can be obtained.

(a) It is possible to reduce an amount of expensive alloy element such as cobalt, nickel or the like as the material of the shadow mask or it is possible to make such an alloy element unnecessary as the material of the shadow mask so that the reduction of cost can be realized compared to the conventional Invar material. (b) The etching characteristics for forming color selection apertures can be enhanced. (c) The strength of material of the shadow mask can be largely increased (5 to 10 times) compared to the shadow mask which is wholly made of Invar material.

Further, (d) the magnetic shield effect is enhanced due to the enhancement of the magnetic characteristics. (e) Due to the physical structures of three or more layers formed of the composite gradient structure of an alloy element, the partial doming can be reduced. (f) The tolerance for the ambient temperature is enhanced.

Further, by adjusting the thicknesses of respective layers of the plural-layer constitution formed of three or more layers, the partial thermal deformation of the apertured region can be suppressed or the doming generated by the thermal expansion of the whole shadow mask is compensated by the thermal deformation of the skirt portions and hence, the design tolerance of the shadow mask structural body including a suspension mechanism engaged with the inner wall of the panel can be enhanced.

Further, as the alloy element of the iron alloy which constitutes the above-mentioned shadow mask material, chromium or nickel-chromium or the like can be used besides nickel.

It is needless to say that the present invention is not limited to the above-mentioned respective constitutions and structures which will be explained in conjunction with embodiments described later and various modifications are conceivable without departing from the technical concept of the present invention.

BRIEF DESCRIPTION OF THE DRAWINGS

FIG. 12A–FIG. 12C is a schematic view for explaining one method of adding an internal stress to the shadow mask.

FIG. 13A–FIG. 13C is a schematic view for explaining another method of adding an internal stress to the shadow mask.

DESCRIPTION OF THE PREFERRED EMBODIMENTS

Hereinafter, with respect to preferred embodiments of the present invention, first of all, a color cathode ray tube is explained in detail in conjunction with drawings which show the embodiments.

Figure 1:
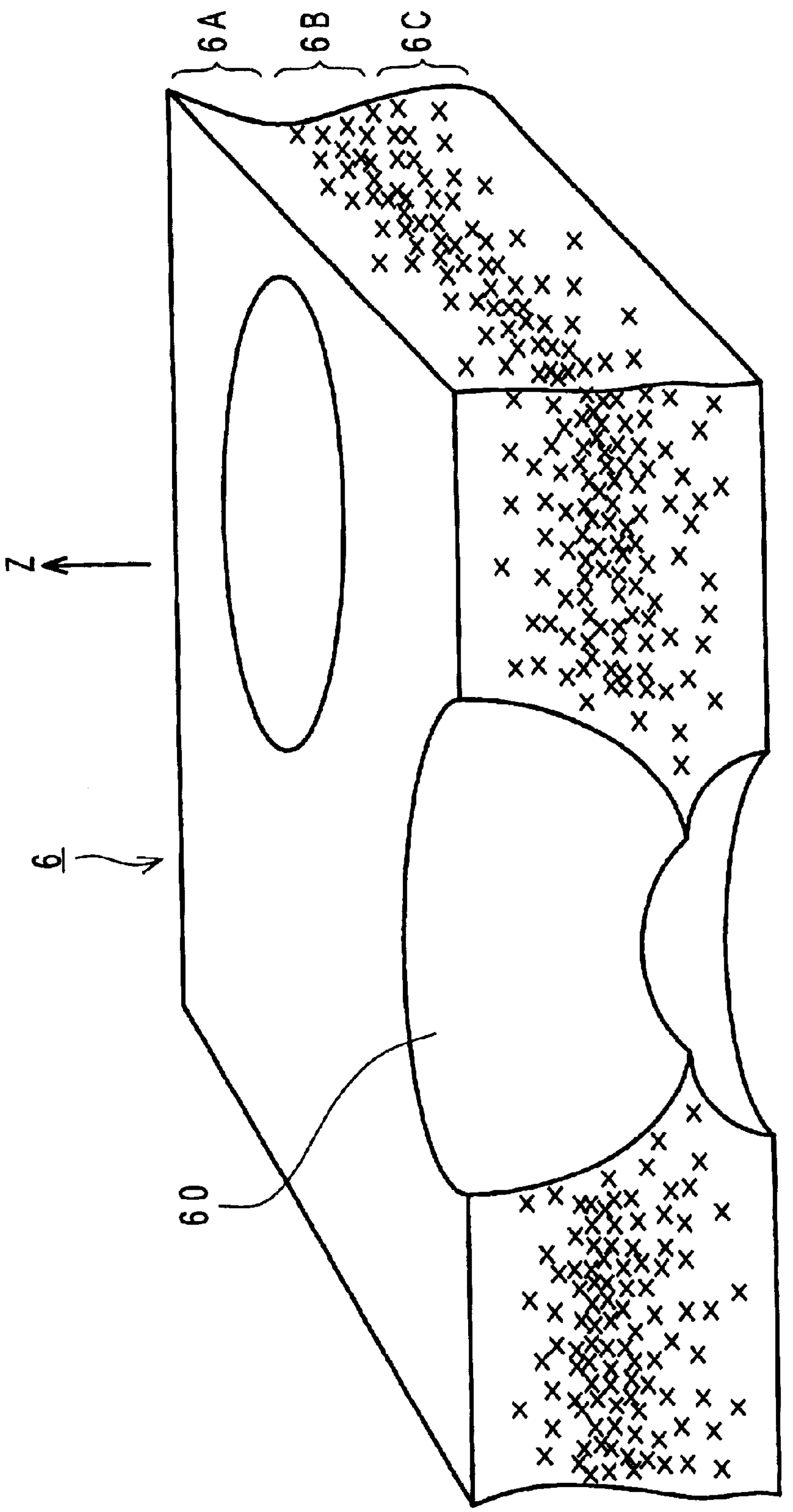
FIG. 1 is a cross-sectional schematic view of an essential part of a shadow mask for explaining the first embodiment of a color cathode ray tube of the present invention.
Figure 2:
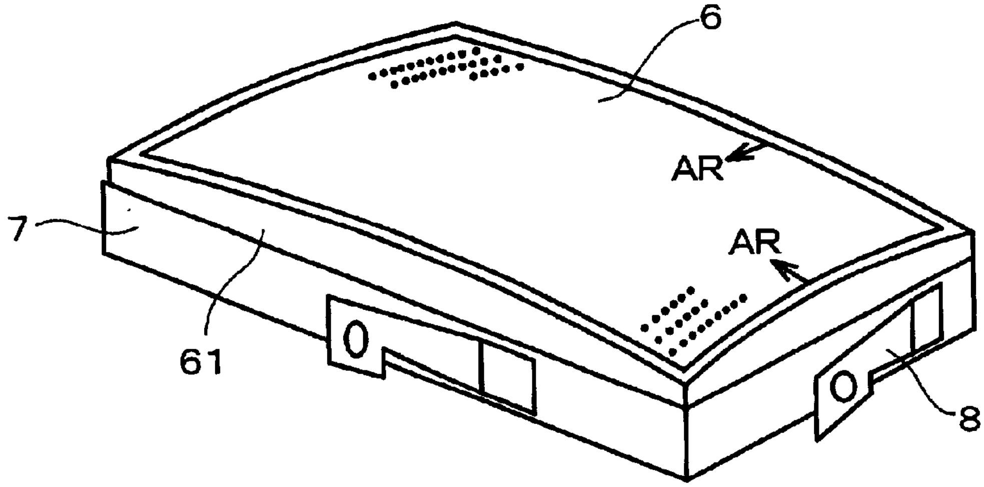
FIG. 2 is a perspective view of a shadow mask structural body installed in the first embodiment of a color cathode ray tube of the present invention.

FIG. 1 is a cross-sectional schematic view of an essential part of a shadow mask for explaining the first embodiment of a color cathode ray tube of the present invention and FIG. 2 is a perspective view of a shadow mask structural body installed in the first embodiment of a color cathode ray tube of the present invention.

With respect to a shadow mask 6 shown in FIG. 2, an apertured region AR which constitutes a main portion of the shadow mask 6 is formed into a curved surface which corresponds to the curvature of an inner surface of a face panel which will be explained later and skirt portions (peripheral portions) 61 which are bent in the approximately tube axis direction are fixedly secured to a mask frame 7 by welding thus constituting a shadow mask structural body. The mask frame 7 is provided with suspension springs 8 which are engaged with stud pins mounted on inner walls of skirt portions of the face panel in a protruding manner. (This constitution will be explained in conjunction with FIG. 17 later.)

The shadow mask according to the present invention is constituted of a composite gradient metal plate body which is formed of an iron alloy having three or more layers which differ in the concentration of an alloy element between neighboring layers and the concentration of the alloy element is continuously changed in the thickness direction at boundary portions of respective layers formed of three or more layers and in the vicinity of the boundary portions.

In this embodiment, the shadow mask material which constitutes the shadow mask 6 is basically made of an iron material or an iron alloy material containing iron as a major component, and is constituted of a single plate body having three layers of different compositions consisting of a first composition portion 6A which exhibits the minimum content of an alloy element at a phosphor screen side which constitutes one surface at a side in the Z axis (tube axis: arrow Z) direction in FIG. 1, a third composition portion 6C which exhibits the minimum content of the alloy element at an electron gun side which constitutes another surface opposite to the above-mentioned one surface, and a second composition portion 6B which is interposed between the first composition portion 6A and the third composition portion 6C and exhibits the maximum content of the alloy element.

The content (also referred to as concentration hereinafter) of the alloy element is continuously increased from the first composition portion 6A to the second composition portion 6B, while the content of the alloy element is continuously decreased from the second composition portion 6B to the third composition portion 6C.

The content of the alloy element becomes maximum at a center portion of the second composition portion 6B. In FIG.

1, although the thicknesses of respective layers 6A, 6B, 6C are set equal, these respective thicknesses can be changed in view of the contour size, the whole thickness of the shadow mask, the degree of flatness of the curved surface of the mask, the structure of the mask suspension mechanism and other factors.

Further, with respect to the shadow mask 6 which contains other alloy element in the first composition portion 6A and the third composition poriton 6C which differs from an alloy element contained in the second composition poriton 6B, the content of the other alloy element becomes maximum in the vicinity of respective surface portions of the first composition portion 6A and the third composition portion 6C and becomes minimum in the vicinity of a boundary portion between the second composition portion 6B and the first composition portion 6A as well as in the vicinity of a boundary portion between the second composition portion 6B and the third composition portion 6C.

Irrespective of whether the alloy elements contained in the above-mentioned respective composition portions are same or different, these respective composition portions have the same constitution with respect to a point that they have the concentration gradient in the thickness direction of the plate body. The plate body which is constituted of a single plate body having a plurality of layers and in which the concentration of the alloy element is continuously changed from one surface side to the other surface side is also referred to as "composite gradient alloy plate" hereinafter. Further, the plate body in which the ratio of the contents of different alloy elements differ in the first composition portion 6A, the second composition portion 6B and the third composition portion 6C can be expressed in the same manner.

FIG. 1 shows a case in which nickel element is used as the alloy element of the composite gradient alloy plate and the nickel element is schematically indicated by "x". Further, the difference of the content of nickel between both side portions (the phosphor screen side and the electron gun side) and the intermediate portion along a cross section of the composite gradient alloy plate which constitutes the shadow mask 6 is indicated by the density of x.

In other words, the composite gradient alloy plate may be referred to as a single plate body which has alloy regions in which the content of element is continuously changed at an intermediate region between a first metal plate having the first composition portion 6A and a second metal plate having the second composition portion 6B as well as at an intermediate region between a second metal plate having the second composition portion 6B and a third metal plate having the third composition portion 6C.

However, this composite gradient alloy plate is different from a conventional so-called clad plate material which is formed by laminating a plurality of different kinds of metal plates (or alloy plates which differ in the content of element or the alloy plates of different kinds of elements). The clad plate material has no gradient with respect to a content, that is, a so-called concentration of the alloy element shown in FIG. 1.

Here, the first composition portion 6A and the third composition portion 6C may be formed of pure iron and the second composition portion 6B may be formed of iron-nickel alloy plate. Alternately, the second composition portion 6B may be formed of metal which contains a large nickel content and the first composition portion 6A and the third composition portion 6C may be formed of metal which contains a small nickel content.

To be more specific, the second composition portion 6B may be formed of Invar material (a nickel-iron alloy containing approximately 36 wt % of nickel) and the first composition portion 6A and the third composition portion 6C may be formed of stainless steel containing approximately 16 wt % of nickel or the second composition portion 6B may be formed of stainless steel containing approximately 17 wt % of nickel and the first composition portion 6A and the third composition portion 6C may be formed of stainless steel containing approximately 16 wt % of nickel.

Further, the second composition portion 6B may be formed of permalloy (a nickel-iron alloy containing approximately 43 wt % of nickel). Here, to take the magnetic characteristics or cost of the material into consideration, it is preferable to restrict the nickel content to not more than 45 wt %.

The shadow mask 6 of this embodiment is produced by forming electron beam apertures 60 which constitute color selection apertures in such a composite gradient alloy plate by etching. Here, although not shown in the drawing, outer peripheries of the region in which these electron beam apertures 60 are formed (apertured region) are subjected to a bending forming in the tube axis Z direction thus forming skirt portions.

These electron beam apertures 60 have a dot shape which defines a large diameter at the phosphor screen side and a small diameter at the electron gun side. The shadow mask in which the electron beam apertures 60 are formed is molded into a given shadow mask shape by press forming and then has the skirt portions thereof welded to the mask frame shown in FIG. 2 and a shadow mask structural body is formed by mounting the suspension springs 8 to the mask frame.

In the embodiment shown in FIG. 1, the shape of the electron beam apertures 60 is formed into a dot shape having an approximately circular shape. However, the present invention is not limited to such a configuration. That is, the present invention can be also carried out by forming the shape of the electron beam apertures into an approximately elongated slot shape which has a long axis in one direction (generally in the vertical deflection direction) or into a continuous slit shape (dotted-slit shape) in one direction (generally in the vertical deflection direction).

By adopting the shadow mask of this embodiment which uses the composite gradient alloy plate as the shadow mask material and by assembling the color cathode ray tube using such a shadow mask, substantially, a following outstanding merit which cannot be obtained with conventional techniques can be obtained.

Since the composite gradient alloy plate does not contain an expensive metal element such as cobalt or the like or since the material which does not contain nickel (or material having a small nickel content) can be used in the first composition portion and the third composition portion, the composite alloy plate can be produced at a low cost compared to the conventional shadow mask which is wholly constituted of Invar material in terms of a material cost. Since the composite gradient alloy plate does not contain cobalt which was contained in the conventional gradient alloy plate for enhancing the favorable erosion resistance, the etching speed at the time of forming the electron beam apertures can be enhanced so that the manufacturing cost of the shadow masks can be reduced.

Due to the presence of the concentration ratio of the alloy element such as nickel which is contained in the composite gradient alloy plate such that the distribution thereof has the gradient among the first composition portion, the second composition portion and the third composition portion, the color selection apertures (the electron beam apertures) can be etched in the desired shape. Further, with respect to the shadow mask according to this embodiment, compared to the shadow mask which is wholly formed of Invar material, the electron beam apertures having the substantially uniform cross-sectional shape can be formed. A color cathode ray tube manufactured by using the shadow mask having such a constitution can suppress the mottled irregularities (mottling) on the phosphor screen which is caused due to the irregularities of shape of electron beam apertures formed in the shadow mask.

Since the distribution of the stress generated at the time of press-forming the composite gradient alloy plate is gradually changed in the inside of the alloy plate, no sharp load is applied to the alloy plate. Accordingly, the strength of the composite gradient alloy plate material can be increased (5 to 10 times, for example) compared to the conventional Invar material.

Since the nickel content can be reduced as a whole, the magnetic permeability is increased and the coercive force is decreased whereby the magnetic characteristics can be enhanced and the shield effect of the earth magnetism is enhanced.

Since the shadow mask material which is formed into a thin plate can largely increase the strength thereof, the generation of the thermal deformation of a portion or the whole of the shadow mask caused by the impingement of the electron beams to the apertured region of the shadow mask, that is, a so-called doming phenomenon can be reduced.

By adjusting the mutual thickness of respective layers, the doming characteristics due to the thermal deformation of partial or whole shadow mask can be properly designed in accordance with the specifications of the cathode ray tube such as the contour size, the degree of flatness of the mask surface of the shadow mask and the like.

Figure 3:
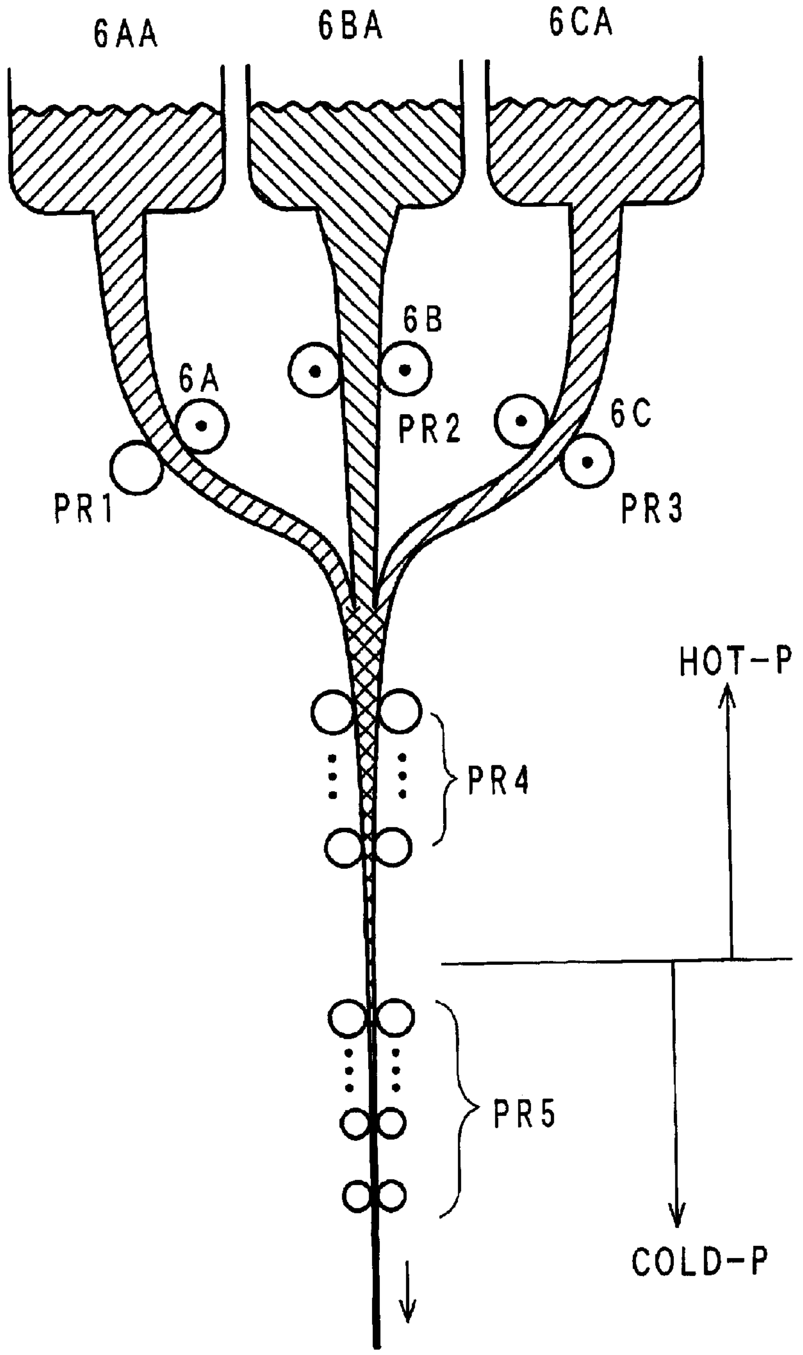
FIG. 3 is an explanatory view of an example of a method for manufacturing a composite gradient alloy plate which constitutes the material of a shadow mask used in a color cathode ray tube of the present invention.

FIG. 3 is an explanatory view of an example of a method for manufacturing the composite gradient alloy plate which constitutes the material of the shadow mask used in the color cathode ray tube of this embodiment. Here, a case in which the second composition portion 6B is formed of Invar material (a nickel-iron alloy containing approximately 36 wt % of nickel) and the first composition portion 6A and the third composition portion 6C are formed of stainless steel containing approximately 16 wt % of nickel is explained.

In FIG. 3, numerals 6AA and 6CA indicate molten material of stainless steel containing approximately 16 wt % of nickel which constitutes the first and third composition and numeral 6BA indicates molten material of Invar material which is made of nickel-iron alloy containing approximately 36 wt % of nickel and constitutes the second composition. These are drawn through rolling rollers PR1, PR2 and PR3 as hot webs and are subjected to a hot rolling by using rolling rollers PR4 in several stages so as to merge them as an integral body.

In such a hot rolling step, alloy layers are respectively formed between the layers formed of the first and third compositions 6A, 6C and the layer formed of the second composition 6B whereby a composite gradient alloy plate having the concentration gradient in which the nickel content is gradually increased or decreased from one surface of the single plate body to the other surface of the single plate body can be produced. Thereafter, the composite gradient alloy plate is subjected to a cold rolling using rolling rollers PR5 in several stages so as to obtain a plate material having a desired thickness as a shadow mask material.

Figure 4B:
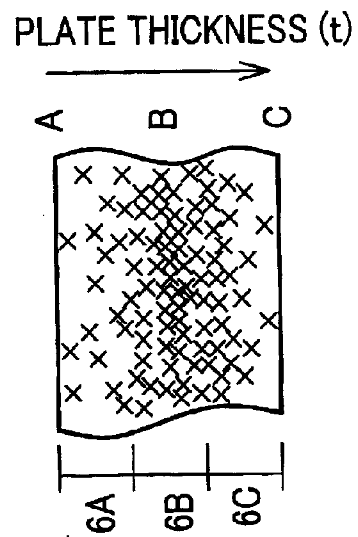
FIG. 4A is a view showing the relationship between the nickel concentration and the plate thickness in the composite gradient alloy plate of the first embodiment of the present invention and FIG. 4B is an explanatory view showing the distribution of nickel in the composite gradient alloy plate.
Figure 4A:
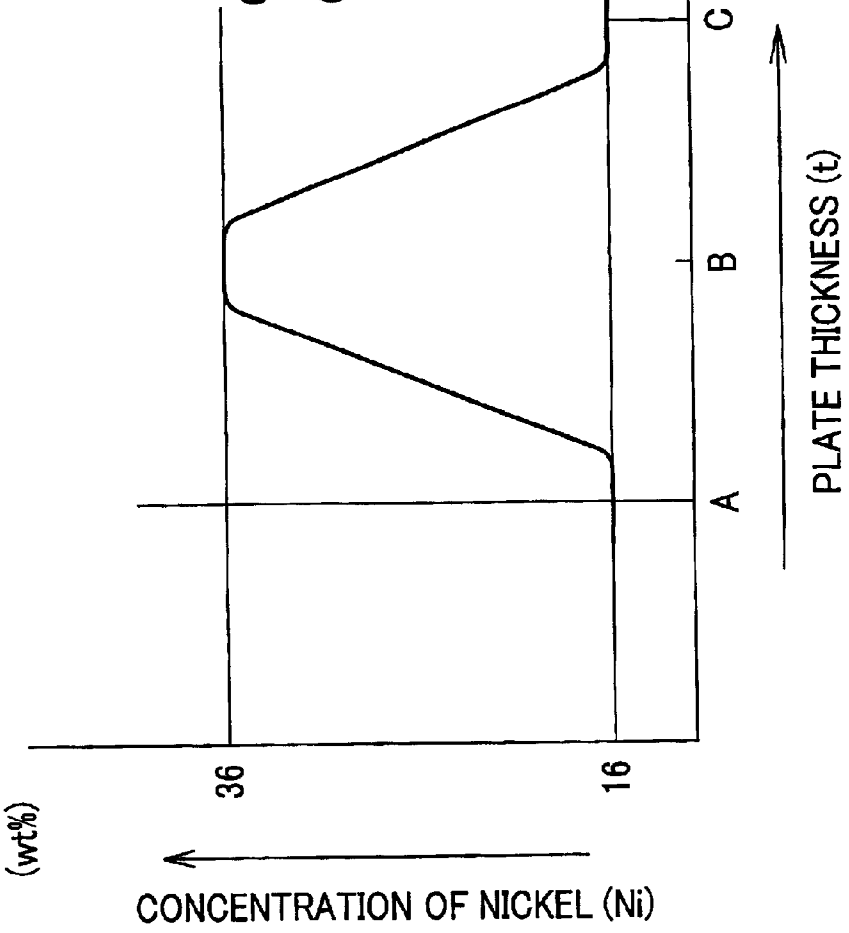

FIG. 4A and FIG. 4B show the distribution of concentration of nickel for explaining the structure of the composite gradient alloy plate obtained by the manufacturing steps shown in FIG. 3, wherein FIG. 4A shows a distribution curve of the nickel concentration and FIG. 4B shows a schematic cross section of the composite gradient alloy plate for explaining FIG. 4A. These drawings show a state in which the nickel content is gradiently and continuously changed such that the nickel content is gradually increased and thereafter is gradually decreased from one surface side to the other surface side in a cross section similar to that of FIG. 1. Here, the concentration of the nickel element is indicated as the density of "X" in FIG. 4B in the same manner as the state shown in FIG. 1.

As shown in FIG. 4A and FIG. 4B, the content of nickel at one surface A side and the other surface C of the composite gradient alloy plate is 16 wt % which is exactly the nickel content of the stainless steel containing approximately 16 wt % of nickel and the nickel content of the B portion between one surface A side and the other surface C side of the composite gradient alloy plate is 36 wt % which is exactly the nickel content of Invar material.

Further, from the surface A side to the center B portion and from the other surface C side to the center B portion, the nickel content is respectively gradually increased from 16 wt % to 36 wt %. The shape of the distribution curve of the nickel concentration shown in FIG. 4A is changed depending on the thickness, temperature and rolling speed of the processing material and other conditions at the time of performing hot rolling or cold rolling.

According to this embodiment which forms the shadow mask using the composite gradient alloy plate having such a structure, the etching characteristics at the time of manufacturing the shadow mask is enhanced. Further, the strength of the shadow mask can be largely enhanced compared to a shadow mask which is wholly formed of Invar material. Further, due to the enhancement of the magnetic characteristics, the magnetic shield effect can be enhanced. Still further, due to the physical structure of the three-layered alloy plate, the doming derived from the thermal deformation of the portion or the whole shadow mask is reduced so that the tolerance in designing of the shadow mask against the ambient temperature can be enhanced.

Figure 5B:
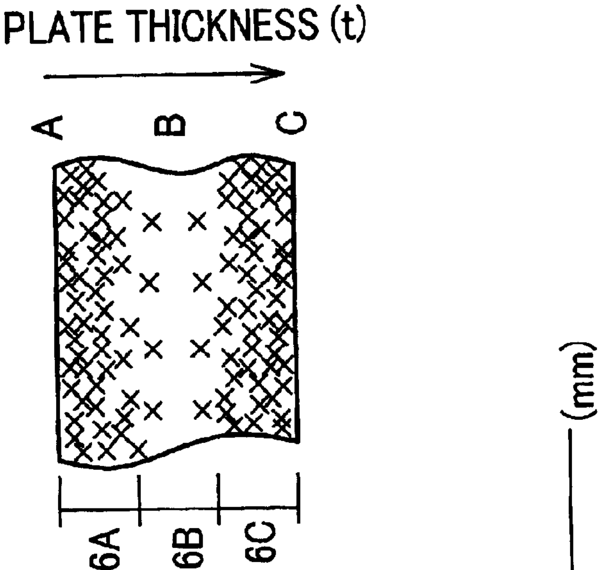
FIG. 5A is a view showing the relationship between the nickel concentration and the plate thickness in the composite gradient alloy plate of the second embodiment of the present invention and FIG. 5B is an explanatory view showing the distribution of nickel in the composite gradient alloy plate.
Figure 5A:
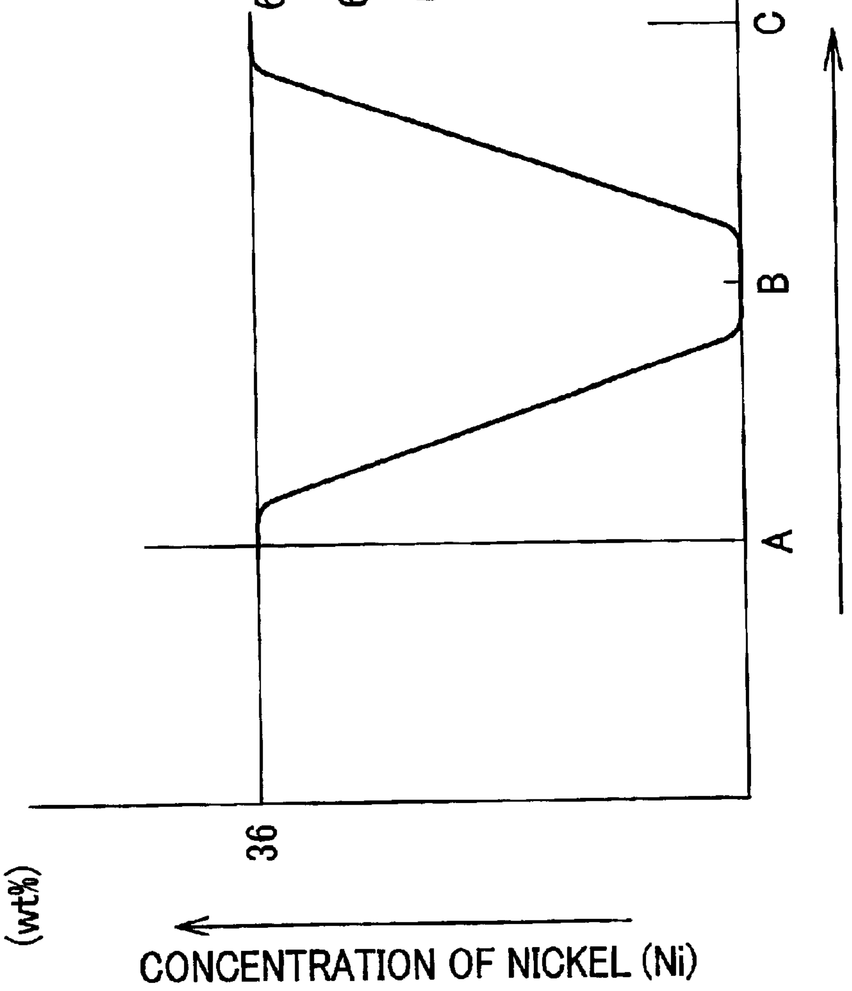

FIG. 5A and FIG. 5B show the distribution of concentration of nickel for explaining the structure of the composite gradient alloy plate of the second embodiment of the present invention, wherein FIG. 5A shows a distribution curve of the nickel concentration and FIG. 5B shows a schematic cross section of the composite gradient alloy plate for explaining FIG. 5A. This composite gradient alloy plate can be also manufactured using steps similar to those shown in FIG. 3.

In this embodiment, as shown in FIG. 5A, the nickel content of one surface A side and the other surface C side of the composite gradient alloy plate is 36 wt % which is exactly the nickel content of Invar material and the nickel content of the B portion between the layer of one surface A side and the layer of the other surface C side of the composite gradient alloy plate is approximately 0 wt %.

Further, from the layer of one surface A side to the layer of the center B portion and from the layer of the other surface C side to the layer of the center B portion, the nickel content is respectively gradually decreased from 36 wt % to approximately 0 wt %. The shape of the distribution curve of the nickel concentration shown in FIG. 5A can be adjusted by changing the thickness, temperature and rolling speed of the processing material and other conditions at the time of performing hot rolling or cold rolling.

Further, in this embodiment, the layer at the center B portion contains other metal or alloy element which differs from nickel. When titanium or a titanium alloy is contained as this different kind of element, since the element is relatively light in weight and exhibits the high strength and the excellent corrosion resistance, the element is preferable as the material of the shadow mask.

This embodiment can also enjoy advantageous effects in the same manner as the first embodiment.

Figure 6B:
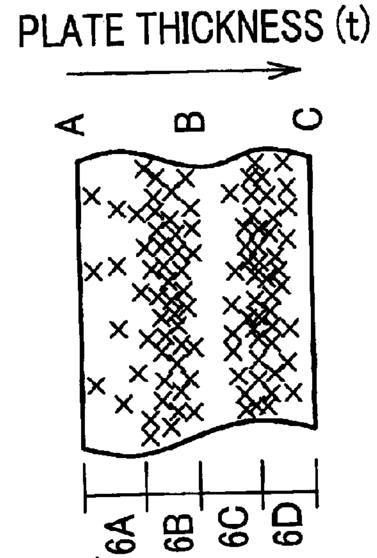
FIG. 6A is a view showing the relationship between the nickel concentration and the plate thickness in the composite gradient alloy plate of the third embodiment of the present invention and FIG. 6B is an explanatory view showing the distribution of nickel in the composite gradient alloy plate.
Figure 6A:
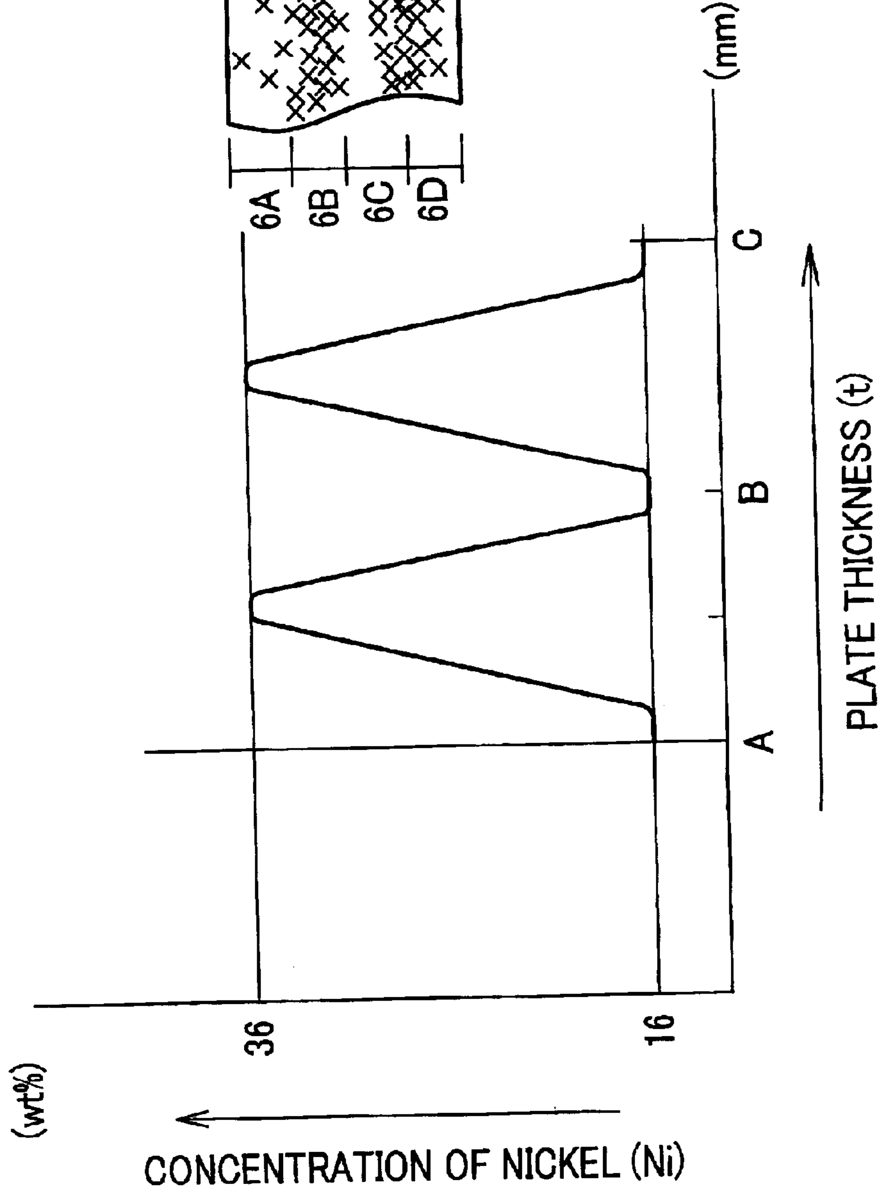

FIG. 6A and FIG. 6B show the distribution of concentration of nickel for explaining the structure of the composite gradient alloy plate of the third embodiment of the present invention, wherein FIG. 6A shows a distribution curve of the nickel concentration and FIG. 6B shows a schematic cross section of the composite gradient alloy plate for explaining FIG. 6A. This composite gradient alloy plate can be also manufactured using steps similar to those shown in FIG. 3. This embodiment provides the composite ingredient alloy plate having four layers which differ in an alloy element content.

As shown in FIG. 6B, the composite ingredient alloy plate includes, from ones surface A side to the other surface C side through a center portion B, a portion 6A in which the nickel concentration is gradually increased, a portion 6B in which the nickel concentration is gradually decreased, a portion 6C in which the nickel concentration is gradually increased, a portion 6D in which the nickel concentration is gradually decreased. In the portion 6A and the portion 6C, the nickel concentration is increased from 16 wt % to 36 wt %, while in the portion 6B and the portion 6D, the nickel concentration is decreased from 36 wt % to 16 wt %. As another example, the composite gradient alloy plate may be configured such that, in the portion 6A and the portion 6C, the nickel concentration is decreased, while in the portion 6B and the portion 6D, the nickel concentration is increased.

This embodiment also can enjoy advantageous effects in the same manner as the first embodiment.

Although the feature of the above-mentioned three-layered composite gradient alloy material as the raw material (base material) lies in that the composite gradient alloy material has the high strength, an internal stress is generated when the material is formed into a curved shape by press forming to be served for a shadow mask. Accordingly, it is possible to give the strength which exceeds the strength of the base material as the shadow mask. With the use of the base material for shadow mask of the present invention, a spherical or an aspherical pre-mask curved surface having large radii of curvature in the X, Y directions of the mask apertured region can be realized. Accordingly, it is possible to design and manufacture an ideal flat tube which appears flat optically, wherein such an ideal flat tube has been conventionally considered as a realm which a so-called tension-mask-type color cathode ray tube which mounts a shadow mask while applying tension to the shadow mask cannot achieve.

Figure 7A:
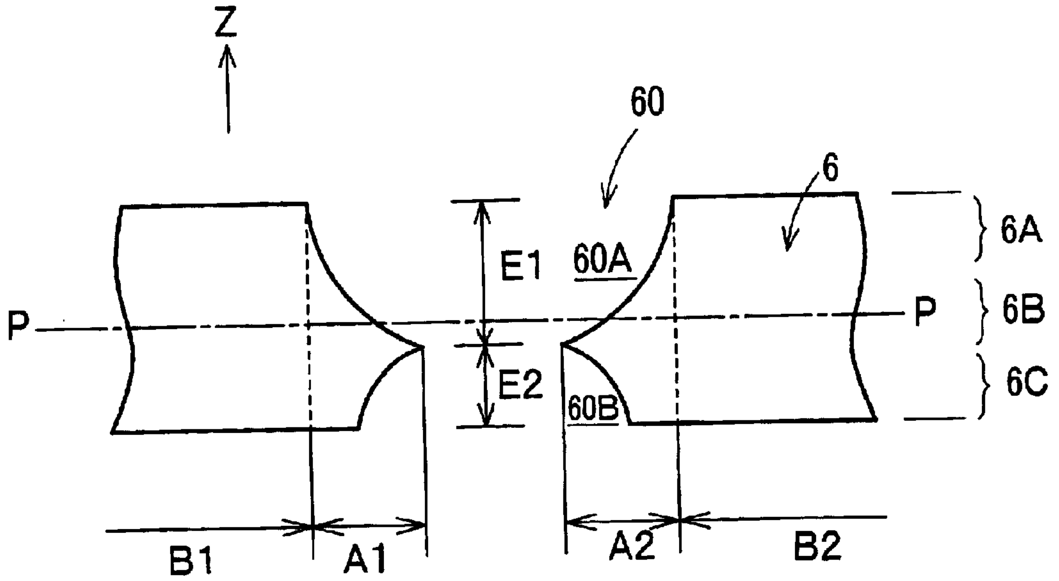
FIG. 7A is a cross-sectional view of an electron beam aperture portion of the shadow mask of a color cathode ray tube according to the present invention and FIG. 7B is an explanatory view showing the distribution of nickel in the composite gradient alloy plate shown in FIG. 7B.
Figure 7B:
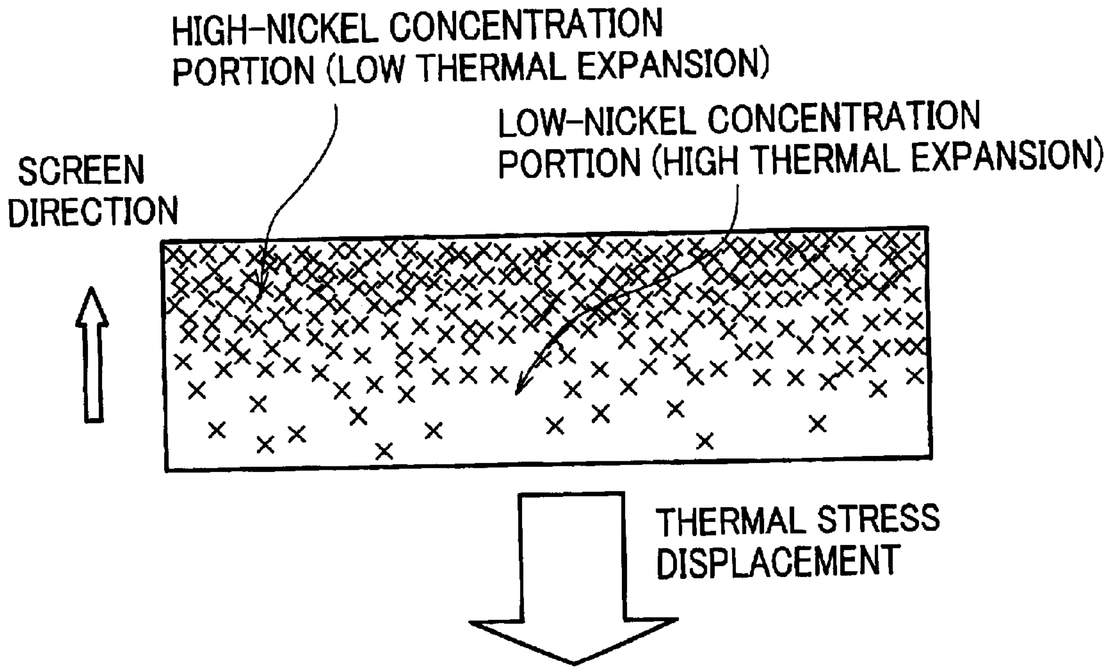

FIG. 7A and FIG. 7B are explanatory views showing the cross-sectional structure of the shadow mask of the color cathode ray tube according to the present invention, wherein FIG. 7A is an enlarged cross-sectional view of an electron beam aperture portion. In the drawing, portions 6A and 6C indicate low-nickel concentration portions and portion 6B indicates a high-nickel concentration portion. The portions 6A and 6C exhibit the high thermal expansion characteristics and the portion 6B exhibits the low thermal expansion characteristics. A portion which exhibits the maximum nickel concentration lies at a center portion in the thickness direction of the plate material (a center line of the plate material being indicated by P—P).

These electron beam apertures 60 are formed by wet etching, wherein each electron beam aperture 60 has a large-diameter hole 60A at a phosphor-screen side indicated by an arrow Z and a small-diameter hole 60B at an electron-gun side. In the drawing, in regions A1 and A2 which are respectively defined between end peripheries of the large-diameter hole 60A and an opening, arises an asymmetry with respect to the volumetric balance of the nickel low-concentration layer in the thickness direction. On the other hand, in regions B1 and B2 in which the electron beam apertures 60 are not formed, these regions attain the volumetric balance of the low-concentration nickel layer.

In this manner, in the portions of layers having substantially equal thermal expansion characteristics at both side portions of the shadow mask 6 in the plate thickness direction (upper and lower portions in the drawing) and attaining the volumetric balance, the deformation derived from the thermal stress is not generated. However, in the portions such as the electron beam aperture 60 portions where the volumetric balance of layers is asymmetrical, the deformation derived from the thermal stress is generated. To take the whole shadow mask into consideration, approximately not less than 300,000 electron beam apertures are formed in the apertured region.

Accordingly, the shadow mask is displaced partially selectively corresponding to the distribution of thermal energy inputted to the shadow mask. Further, the displacement quantity corresponds to the energy which is obtained by integrating the thermal stress energy generated per one electron beam aperture only within a range in which the thermal energy is inputted. In view of the above, the mechanism of the thermal stress displacement derived from the cross-sectional shape effect and the stress integration effect of the electron beam apertures of the shadow mask is referred to as "mass effect".

Here, the doming correction mechanism derived from the mass effect is a mechanism which enables the doming correction for the window display pattern. In the conventional technique, there has been no technique which corrects the partial doming such as the window display pattern.

Here, the mechanism of the doming correction derived from the mass effect is explained in conjunction with FIG. 7. In the regions B1 and B2 where the electron beam apertures 60 are not formed, the portions 6A and 6C having the high thermal expansion characteristics are balanced in the plate thickness direction of the shadow mask 6 with the portion 6B having the low thermal expansion characteristics arranged at the center in the plate thickness direction. Accordingly, the direction of the thermal expansion due to the temperature elevation of the shadow mask 6 is arranged in the planar direction of the shadow mask 6.

On the other hand, in the regions A1 and A2 where the electron beam apertures 60 are formed, the portions 6A and 6C which exhibit the high thermal expansion characteristics are not balanced in the plate thickness direction of the shadow mask 6. That is, the portion 6A is smaller than the portion 6C in volume. Accordingly, with respect to these regions A1 and A2, as shown in FIG. 7B, these regions are equivalent to a bimetal structure in which, as a whole, the large-diameter 60A side (phosphor screen side) assumes the portion 6B which exhibits the low thermal expansion characteristics and the small-diameter 60B side (electron gun side) assumes the portion 6C which exhibits the high thermal expansion characteristics.

To focus on the thermal behavior in this bimetal equivalent model, the shadow mask 6 acts such that the shadow mask 6 is displaced in the direction away from the phosphor screen when the temperature is elevated. This displacement direction is the direction which offsets the thermal expansion toward the phosphor screen due to the temperature elevation of the conventional shadow mask, that is, the direction to suppress the doming phenomenon. Particularly, assuming that the thermal expansion coefficient of the above-mentioned portion 6B is not more than 50% with respect to the thermal expansion coefficients of the portions 6A and 6C in the atmosphere of 0 to 400 degree centigrade, the doming can be effectively suppressed.

Further, since this mechanism utilizes the stress which is generated due to the cross-sectional structure (shape of electron beam apertures) of the shadow mask, the mechanism can also effectively cope with the local doming phenomenon which may take place at the time of window pattern display.

In the steps for manufacturing the shadow mask before forming the electron beam apertures 60, since the composite gradient alloy plate according to this embodiment is formed of only the regions B1 and B2 where the electron beam apertures 60 are not formed, the thermal behavior such as the above-mentioned bimetal equivalent model hardly occurs. Accordingly, in heating steps such as a step for forming a film pattern of the shadow mask and an etching step, the twisting deformation of the alloy plate hardly occurs.

In this manner, with the use of the composite gradient alloy plate which is constituted of the center portion having the first thermal expansion characteristics in the plate thickness direction and the both-side portions having the second thermal expansion characteristics in the plate thickness direction while sandwiching the center portion therebetween, the etching characteristics for forming the electron beam apertures are made stable so that the shadow mask original plate can be easily manufactured. Particularly, when the difference in the thermal expansion coefficient between one of both-side portions having the second thermal expansion characteristics and the other of both-side portions is not more than 20% in the atmosphere of 0 to 400 degree centigrade, the manufacturing yield factor of the shadow mask original plate is enhanced.

According to this embodiment, when the temperature of the shadow mask rises, the portions where the electron beam apertures 60 are formed are deformed in the direction to correct (compensate) the doming derived from the partial or the whole thermal deformation and hence, the generation of color slurring can be suppressed.

Then, when the composite gradient alloy plate of this embodiment is used as the shadow mask material, it can be easily formed into a shadow mask having small curvature so that it is possible to form the shadow mask having the small curvature which corresponds to the curvature of an inner surface of a face panel which is made closer to flatness.

With respect to the region of the single plate body made of the above-mentioned alloy element which has the concentration gradient directed from one surface to another surface of the single plate body, it is preferable to form such a region over the whole shadow mask. However, such a region may be partially formed corresponding to the use of the color cathode ray tube. For example, corresponding to the mechanical characteristics of the shadow mask against an external force and the thermal characteristics of the shadow mask against the impingement of the electron beams, the concentration gradient region of the above-mentioned alloy element may be formed by selecting from a group consisting of the apertured region AR, the peripheral portions 61 (skirt portions) and outer marginal portions which surround the apertured portion AR (non-apertured portion) the shadow mask 6.

Figure 8:
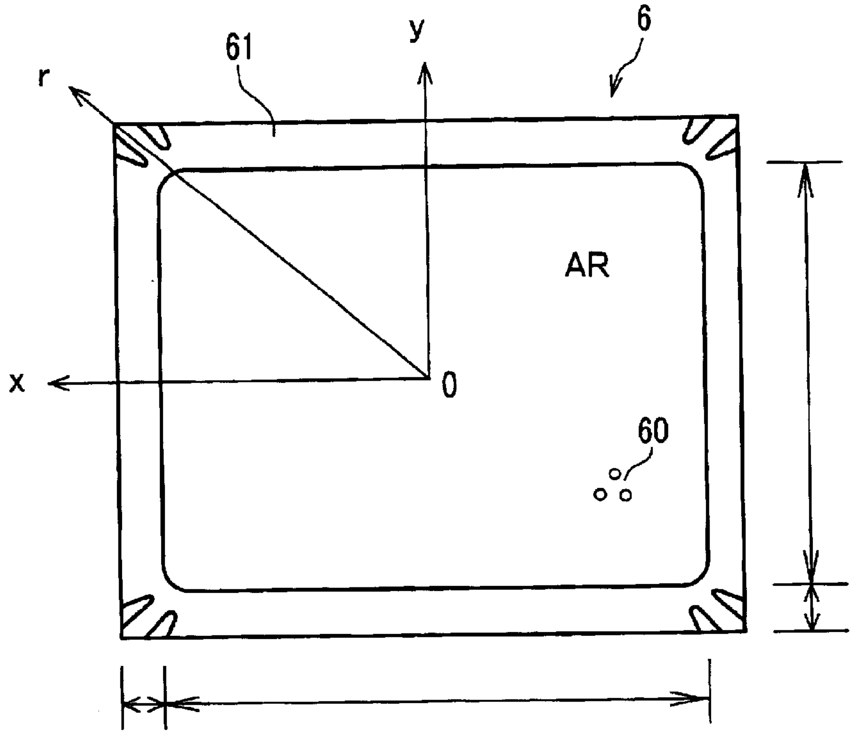
FIG. 8 is a plan view schematically showing the shadow mask before press forming for explaining the fourth embodiment of the color cathode ray tube of the present invention.
Figure 9:
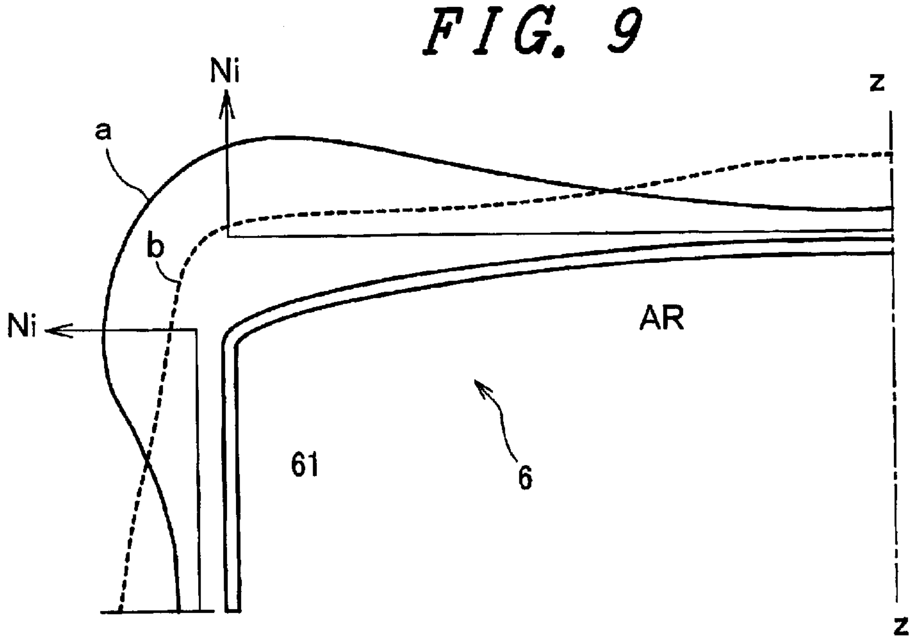
FIG. 9 is a view showing the distribution of alloy content concentration of a plate material which constitutes the shadow mask.
Figure 10A:
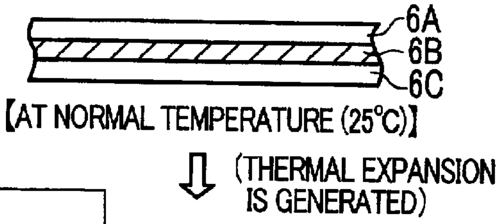
FIG. 10A–FIG. 10F is a schematic step view for explaining a method for manufacturing a composite gradient alloy shown in FIG. 1.
Figure 10B:
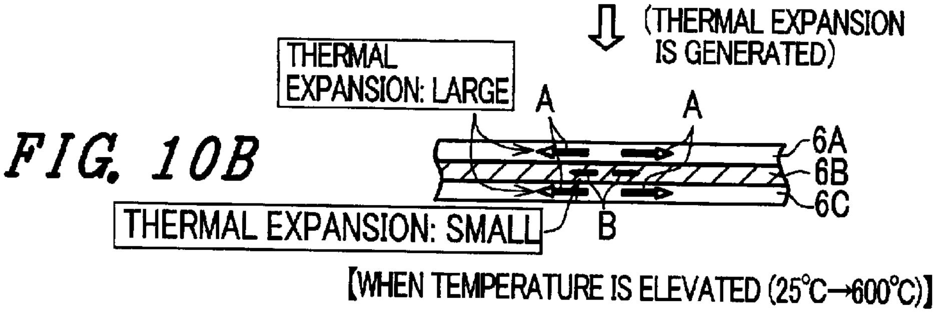
Figure 10C:
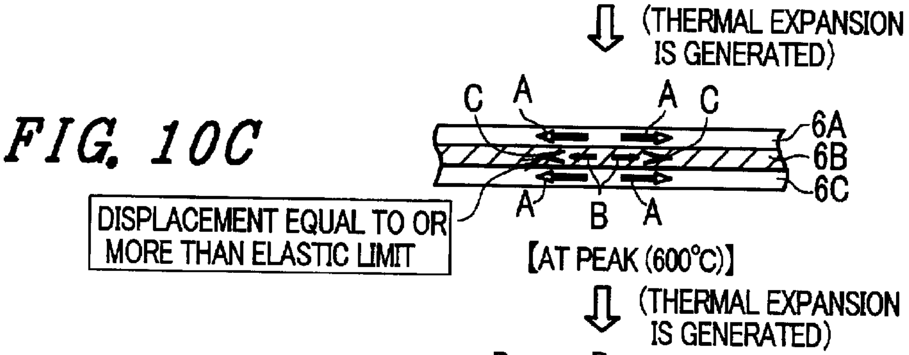
Figure 10D:
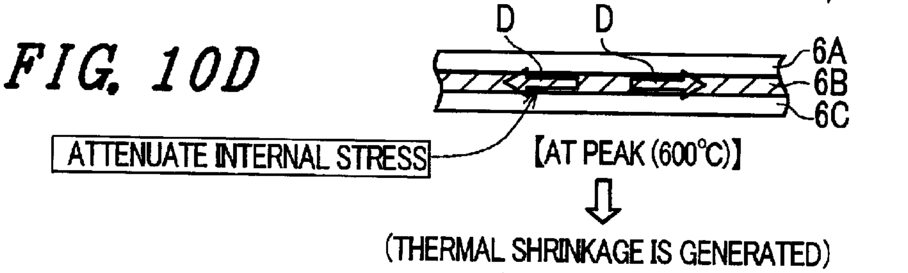
Figure 10E:
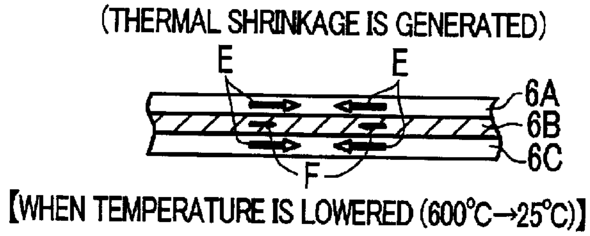
Figure 10F:
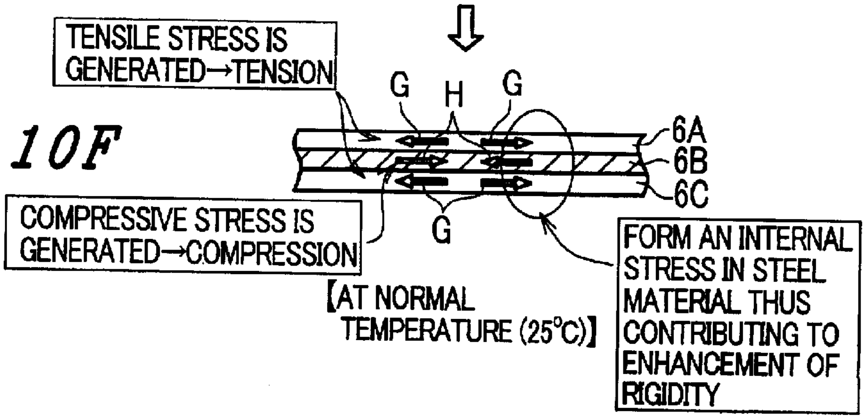

FIG. 8 is a plan view which schematically shows the shadow mask before press forming to explain the fourth embodiment of the color cathode ray tube of the present invention. Further, FIG. 9 is a view showing the distribution of the concentration of alloy content in a plate material constituting a shadow mask. The shadow mask 6 includes skirt portions 61 outside an apertured region AR in which electron beam apertures 60 are formed. In the drawings, x indicates the horizontal direction, y indicates the vertical direction and r indicates the diagonal direction.

In this embodiment, assuming that a three-layered composite gradient alloy plate which is formed substantially in the same way as the composite gradient alloy plate which is previously explained in conjunction with FIG. 1 is used, the nickel content in the apertured region AR and the skirt portions 61 is set to exhibit the distribution characteristics "a" or "b" shown in FIG. 9 at least in one direction out of the x direction, the y direction and the r direction in FIG. 8.

With respect to the shadow mask after forming or shaping, the partial mechanical deformation applied to the panel during manufacturing at the time of mounting or dismounting, the partial thermal deformation due to the window display pattern and the total thermal deformation due to the entire screen display during the operation of the color cathode ray tube differ depending on the flatness of the curved surface of the mask. By adopting the composite gradient alloy plate having the layer structure which like the distribution characteristics "a" and "b" of nickel content shown in FIG. 9 are made such that the alloy plate has the concentration gradient in the planar direction of the alloy plate, it is possible to compensate for the doming derived from the partial or the whole thermal deformation of the apertured region AR by utilizing the thermal deformation of the skirt portions 61.

The contour of the base material of the shadow mask 6 and the contour of the shadow mask 6 after press forming are substantially equal to those of the conventional shadow mask. This implies that a manufacturing facility for the conventional shadow mask can be used directly without remodeling. In this manner, according to the present invention, it is possible to perform the designing of the color cathode ray tube which can achieve the flattening of the regions which have been impossible to achieve by the conventional technique in view of the strength of the shadow mask.

Subsequently, a method according to the present invention for manufacturing a composite gradient alloy to which an internal stress is applied and a method for constituting a shadow mask of a color cathode ray tube using the composite gradient alloy are explained.

FIG. 10 is a schematic step view for explaining the method for manufacturing a composite gradient alloy shown in FIG. 1, wherein a mechanism for making the internal stress remain in a base material for composite gradient alloy is shown. In FIG. 10, (*a*) to (*f*) indicate the order of steps.

The base material for composite gradient alloy includes a plurality of constituent layers which are laminated while continuously changing the concentration of the alloy element in the thickness direction of an iron-alloy plate containing the alloy element in iron. Here, the composite gradient alloy having the constituent layers in three layers is picked up as an example and a method which makes an internal stress remain in the base material for composite gradient alloy of three-layered structure having approximately the same high thermal expansion at one surface layer and the other surface layer and the low thermal expansion coefficient at an intermediate layer is explained. Here, the reference numerals in the drawing are made equal to those shown in FIG. 1, considering the shadow mask.

Step a

Three molten materials which differ in the content concentration of the alloy element are merged by hot rolling so as to form a base material 6 for composite gradient alloy plate (corresponding to original plate of shadow mask) formed of a plurality of constituent layers having different thermal expansion coefficients which is obtained by continuously changing the concentration of the alloy element. Here, one surface layer 6A and the other surface layer 6C form the constituent layers which has substantially the same alloy concentration and the high thermal expansion coefficient, while the intermediate layer 6B contains the alloy element at the concentration higher than that of the above-mentioned both surface layers and exhibit the low thermal expansion coefficient. The concentration of the alloy element in the boundary regions of respective constituent layers is continuously changed in the depth direction, (6A⇆6B, 6C⇆6B). Here, nickel Ni is used as the alloy element. The base material for composite gradient alloy plate is subjected to cold rolling as shown in FIG. 3 and thereafter is left or placed under normal temperature.

Step b

The base material 6 for composite gradient alloy plate is heated such that the temperature is elevated from the normal temperature to approximately 600 degree centigrade (or more). In FIG. 10(*b*), arrows A, A indicate the thermal expansion directions of one surface layer 6A and the other surface layer 6C, and arrows B, B indicate the thermal expansion directions of the intermediate layer 6B, and the magnitude of each arrow shows a displacement amount due to the thermal expansion. As shown in the drawing, the displacement amount of one surface layer 6A and the other surface layer 6C is larger than the displacement amount of the intermediate layer 6B.

Step c

Among the above-mentioned plurality of constituent layers, the temperature of the constituent layers 6B, 6C of high thermal expansion is elevated to a temperature at which the constituent layer 6B, 6C are displaced by an amount equal to or more than an elastic limit of the constituent layer 6B of the low thermal expansion. In the drawing, an arrow C indicates a state in which the constituent layer 6B is pulled by the displacement of the constituent layers 6B, 6C of high thermal expansion and is displaced by an amount exceeding the elastic limit. Since boundary regions formed between the constituent layers 6B, 6C of high thermal expansion and the constituent layer 6B of low thermal expansion are formed of alloy phases, there is no fear that respective boundaries are mechanically separated.

Step d

While holding the elevated temperature at a peak, the internal stress of the constituent layer 6B of the low thermal expansion is attenuated. That is, at the peak temperature of this heating, the constituent layer 6B which is displaced by expansion by an amount exceeding the elastic limit as shown in FIG. 10(*d*) exhibits the thermal expansion equivalent to the thermal expansion of a single metal layer thereafter. Arrows D indicate the displacement due to the thermal expansion.

Step e

The temperature is returned to the normal temperature from the peak temperature. In this process, the constituent layers 6B, 6C of high thermal expansion shrink as indicated by arrows E in the drawing. Here, the constituent layer 6B of low thermal expansion also shrinks as a single metal in response to the thermal expansion coefficient thereof. Arrows F indicate the displacement of the constituent layer 6B of low thermal expansion.

Step f

Thereafter, the base material 6 for composite gradient alloy plate is left or placed under normal temperature. As a result, the tensile stress indicated by arrows G in FIG. 10(*f*) remains in the constituent layers 6A, 6C of high thermal expansion, while the compressive stress indicated by an arrow H is generated in the constituent layer 6B of low thermal expansion. These stresses remain as the internal stress in the base material 6 for composite gradient alloy plate so that a plate material having a large rigidity (composite gradient alloy plate added with internal stress) is produced.

Here, the plate material may be configured such that one surface layer and the other surface layer are formed of low-expansion layers and the intermediate layer is formed of a high expansion layer. A mechanism which makes the internal stress remain in the plate material can be explained in the same manner as the above-mentioned plate material.

Further, it is also possible to generate the internal stress in the inside of the base material 6 for composite gradient alloy plate by making the thermal expansion coefficient in the planar direction of the base material 6 for composite gradient alloy plate differ from each other among a plurality of constituent layers or by making the thermal expansion coefficient in the planar direction of one surface layer substantially equal to the thermal expansion coefficient in the planar direction of the other surface layer.

Figure 11:
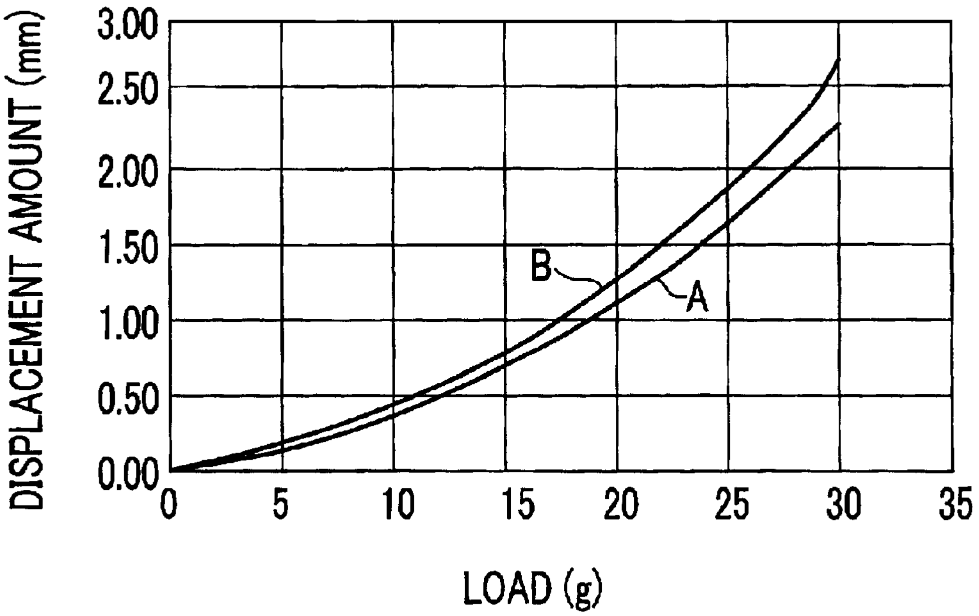
FIG. 11 is an explanatory view for explaining a result of a static load test which is performed for comparing the strength of a shadow mask formed by using a composite gradient alloy plate of the present invention added with an internal stress and the strength of a conventional shadow mask made of Invar material.

FIG. 11 is an explanatory view showing a result of a static load test which is carried out to compare the strength of a shadow mask formed by molding using the composite gradient alloy plate added with internal stress according to the present invention and the strength of a conventional Invar material. In the drawing, a curve A indicates characteristics of a shadow mask formed using the composite gradient alloy plate added with internal stress according to the present invention and a curve B indicates characteristics of a shadow mask formed using the conventional Invar material.

In the static load test, four sides of the shadow mask were held horizontally and a displacement amount which was generated when a vertical load was applied to a center portion of the shadow mask was measured. From the result of the measurement, it was found that the shadow mask formed using the composite gradient alloy plate added with internal stress according to the present invention reduced the displacement amount by approximately 10% compared to the conventional shadow mask made of Invar material. As methods for making the stress remain in the inside of the shadow mask when the composite gradient alloy plate is used to form the shadow mask, following methods are considered.

FIG. 12 is a schematic view for explaining one method for adding the internal stress to the shadow mask. This method is performed in accordance with following steps. (a) First of all, the heat treatment which has been explained in conjunction with FIG. 10 is applied to the base material 6 for composite gradient alloy plate which will become the shadow mask so as to make the internal stress remain in the base material 6 for composite gradient alloy plate. The electron beam apertures in a dot shape, a slit shape or a dotted-slit shape are formed in the base material 6 for composite gradient alloy plate using a photolithography method or the like. A pressed mask is formed by press machining. (b) Then, the base material 6 for composite gradient alloy plate, that is, the shadow mask 6 is secured to a given frame 7 thus forming a shadow mask structural body 5. (c) Thereafter, the shadow mask structural body 5 is transferred to a subsequent manufacturing process of a color cathode ray tube.

FIG. 13 is a schematic view for explaining another method for adding the internal stress to the shadow mask. This method is performed in accordance with following steps. (a) First of all, without applying the heat treatment which has been explained in conjunction with FIG. 10 to the base material 6 for composite gradient alloy plate which will become the shadow mask, the base material 6 for composite gradient alloy plate which has no internal stress is prepared. The electron beam apertures in a dot shape, a slit shape or a dotted-slit shape are formed in the base material 6 for composite gradient alloy plate using a photolithography method or the like. A pressed mask is formed by press machining. (b) Then, the base material 6 for composite gradient alloy plate, that is, the shadow mask 6 is secured to a given frame 7 thus forming a shadow mask structural body 5. (c) Thereafter, the shadow mask structural body 5 is transferred to a subsequent manufacturing process of a color cathode ray tube. This subsequent manufacturing process of the color cathode ray tube includes various type of heating steps. Among such heating steps, there exists a step in which the temperature is elevated from the normal temperature to 600 degree centigrade or more. In this heating step, the internal stress is added as has been explained in conjunction with FIG. 10.

Whichever method be adopted, the strength of the shadow mask which constitutes a part of the completed color cathode ray tube is enhanced so that the deformation such as doming or the like which may be generated due to an external shock or a thermal environment in operation can be suppressed.

The color selection electrode structure of present invention is lighter than a color selection electrode structure of prior art. Especially, the frame of tension type color selection electrode structure can be lightened by this invention.

The display characteristics of the color cathode ray tube which uses various kinds of flat masks are explained.

Figure 14A:
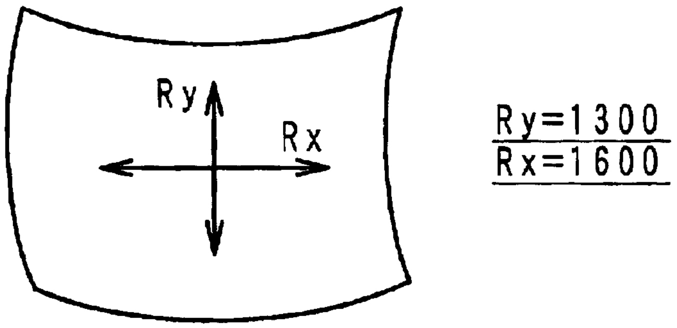
FIG. 14A is a schematic view of an apertured portion of a press-type shadow mask formed of Invar material of an comparison example.
Figure 14B:
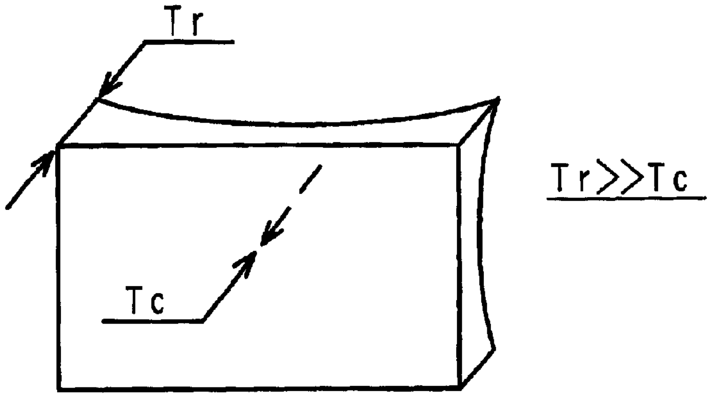
FIG. 14B is a schematic view of a image display screen of a panel.
Figure 14C:
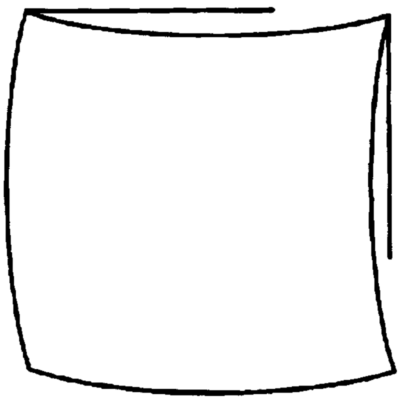
FIG. 14C is a schematic explanatory view of an image observed on a face panel when the shadow mask shown in FIG. 14A and the panel shown in FIG. 14B are combined.

FIG. 14A to FIG. 14C are schematic explanatory views of an image of the shadow mask formed of Invar material as the comparison example of the present invention which is actually observed on the flat face panel when the shadow mask is assembled to the flat face panel having an inner surface with a large curvature. That is, FIG. 14A is a schematic explanatory view of the shadow mask formed of Invar material as the comparison example of the present invention, FIG. 14B is a schematic explanatory view of the flat face panel having the inner surface with the large curvature and FIG. 14C is a schematic explanatory view of the image of the shadow mask which is actually observed on the face panel when the shadow mask is assembled to the face panel.

With respect to a color cathode ray tube formed of a so-called tension mask, it is difficult to make a shadow mask(color selection electrode having dotted-line-like electron beam apertures or slot-like electron beam apertures) have a curvature in the tension applying direction and hence, the radius of curvature of the inner surface of the panel also becomes infinite in the tension applying direction.

To show an example of specific numerical values, they are as follows. FIG. 14A shows an apertured region of the shadow mask which is formed by a press into a shape having an average radius of curvature Rx in the horizontal (along a long axis) direction of 1600 mm and an average radius of curvature Ry in the vertical (along a short axis) direction of 1300 mm. FIG. 14B shows an effective screen region of the face panel having an approximately flat outer surface and an inner surface with the large curvature. With respect to this effective screen region, a thickness Tr of a corner portion in the tube axis direction is set considerably larger than a thickness Tc of a center portion in the tube axis direction ($Tr \gg Tc$).

In this case, assuming a wall thickness difference ($Tr-Tc$) between at the corner (an end in the diagonal direction) and at the center of the panel effective screen to be a diagonal wedge amount Wr, the ratio Wr/Tc between the wedge amount Wr and the wall thickness Tc at the center of the face panel is set to not less than 1.2. With respect to the shadow mask formed by a press, as shown in FIG. 14C, the shadow mask appears such that the screen is recessed more as a position on the shadow mask is shifted from the center of the panel to the periphery of the panel. Then, with respect to the viewing direction, the center of the screen is bulged so that an image with a little flat feeling is observed.

Figure 15A:
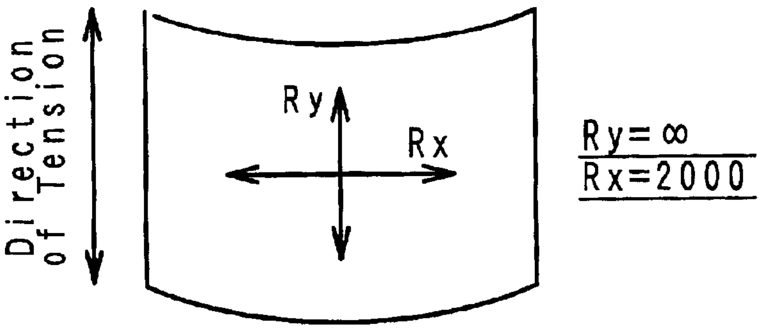
FIG. 15A is a schematic view of an apertured portion of a shadow mask formed into a cylindrical surface.
Figure 15B:
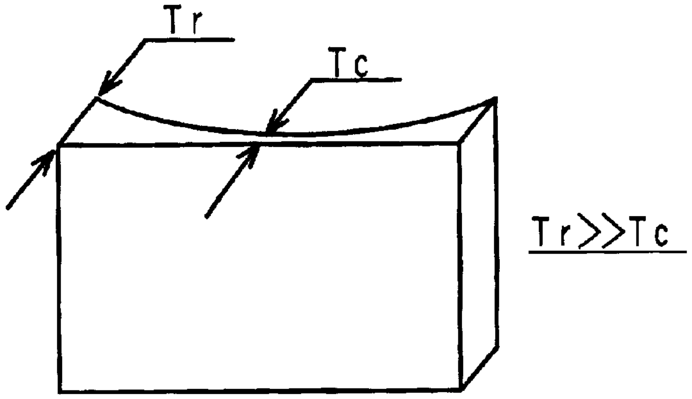
FIG. 15B is a schematic view of a flat-face panel having a curvature only in the horizontal direction.
Figure 15C:
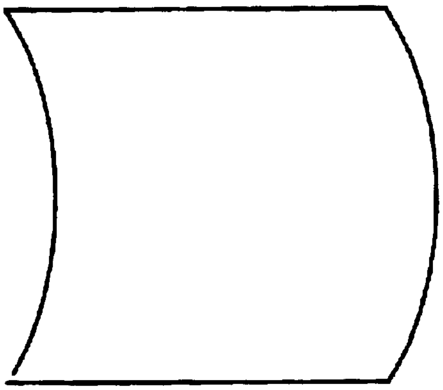
FIG. 15C is a schematic explanatory view of an image which is actually observed on a face panel when the shadow mask shown in FIG. 15A and the panel shown in FIG. 15B are combined.

FIG. 15A to FIG. 15C are schematic explanatory views of an image of the shadow mask which is actually observed on the face panel when the shadow mask formed in a cylindrical shape is assembled to the face panel to which the curvature is given only in the horizontal direction. That is, FIG. 15A is a schematic explanatory view of a shadow mask formed in a cylindrical surface shape, FIG. 15B is a schematic explanatory view of the flat face panel having a curvature only in the horizontal direction on the inner surface thereof, and FIG. 1C is a schematic explanatory view of the image of the shadow mask which is actually observed on the face panel when the shadow mask is assembled to the face panel.

To show an example of specific numerical values, they are as follows. FIG. 15A shows an apertured region of the shadow mask (a so-called dotted-line-like color selection electrode) which is formed into a shape having an average radius of curvature Rx in the horizontal (along a long axis) direction of 2000 mm and a radius of curvature Ry in the vertical (along a short axis) direction of an infinite value ($\infty$). FIG. 15B shows an effective screen region of the face panel having an approximately flat outer surface and an inner surface which has a curvature only in the horizontal direction. With respect to this effective screen region, a thickness Tr of a corner portion in the tube axis direction is set considerably larger than a thickness Tc of a center portion in the tube axis direction ($Tr \gg Tc$). In this case, the ratio Wr/Tc between the wedge amount Wr in the diagonal direction and the wall thickness Tc at the center of the face panel is set to not less than 1.0.

The shadow mask formed in the cylindrical surface shape constitutes a so-called tension mask to which tension is applied in the vertical direction as shown in FIG. 15A. It is difficult to make the shadow mask have a curvature in the tension applying direction. Accordingly, the inner surface of the face panel also has an approximately infinite radius of curvature with respect to the tension applying direction of the shadow mask. That is, the inner surface of the face panel is substantially linear in the vertical direction. Accordingly, due to the refraction of the glass material which constitutes the face panel, the center portion of the face panel is observed to be curved in a concave shape in the vertical direction as shown in FIG. 15C.

Figure 16A:
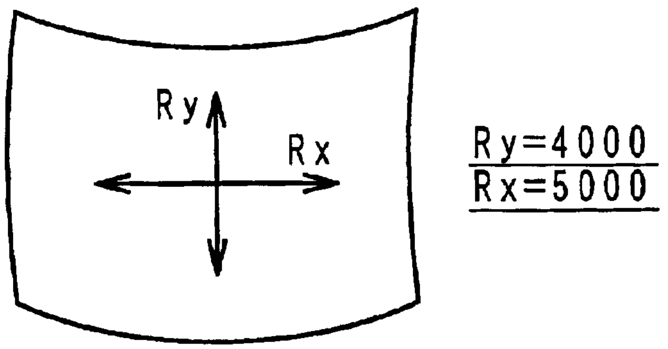
FIG. 16A is a schematic view of an apertured portion of a shadow mask formed of a shadow mask material of an embodiment of the present invention.
Figure 16B:
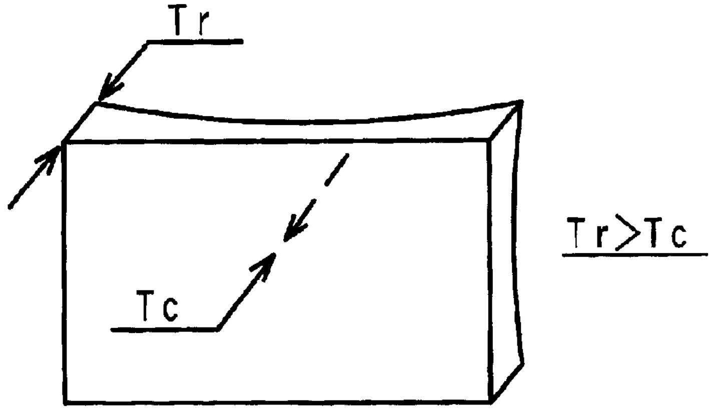
FIG. 16B is a schematic view of a face panel having an inner surface of small curvature and a flat outer surface.
Figure 16C:
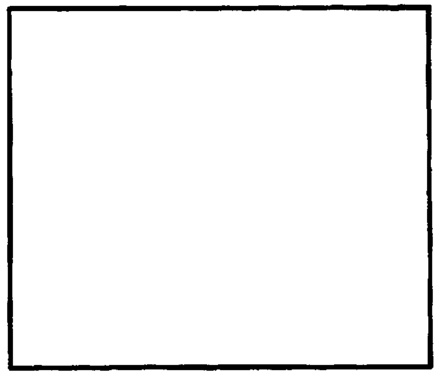
FIG. 16C is a schematic explanatory view of an image which is actually observed on a face panel when the shadow mask shown in FIG. 16A and the panel shown in FIG. 16B are combined.

FIG. 16A to FIG. 16C are schematic explanatory views of an image of the shadow mask formed of the shadow mask material of this embodiment of the present invention which is actually observed on the face panel when the shadow mask is assembled to the flat face panel having an inner surface with a small curvature. That is, FIG. 16A is a schematic explanatory view of the shadow mask which is formed of the shadow mask material of this embodiment, FIG. 16B is a schematic explanatory view of the flat face panel having the inner surface with the small curvature and FIG. 16C is a schematic explanatory view of the image of the shadow mask which is actually observed on the face panel when the shadow mask is assembled to the face panel.

To show an example of specific numerical values, they are as follows. FIG. 16A shows an apertured region of the shadow mask which is formed by a press into a shape having an average radius of curvature Rx in the horizontal direction (along a long axis) of 5000 mm and an average radius of curvature Ry in the vertical direction (along a short axis) of 4000 mm. FIG. 16B shows an effective screen region of the face panel having an approximately flat outer surface and an inner surface with a curvature which is smaller than the curvature shown in FIG. 14B. With respect to this effective screen region, a thickness Tr of a corner portion in the tube axis direction is set slightly larger than a thickness Tc of a center portion in the tube axis direction (Tr>Tc).

With the provision of the constitution of this embodiment, the design of a cathode ray tube which satisfies conditions which make the shadow mask appear optically flat can be realized for the first time. That is, the shadow mask of this embodiment exhibits the large physical strength and the material for the shadow mask has a bimetal action and hence, the shadow mask per se has a doming correction function. Accordingly, with the use of a press, it becomes possible to form the shadow mask into a shape which is substantially flat, wherein an average radius of curvature Rx in the horizontal direction (along the long axis) and an average radius of curvature Ry in the vertical direction (along a short axis) are respectively set to not less than 3000 mm.

Accordingly, the difference (a corner wedge amount Wr) between a thickness Tr of a corner portion and a thickness Tc of a center portion of the face panel shown in FIG. 16B can be decreased so that an optical distance LrTr of the thickness Tr of the corner portion and an optical distance LcTc of the thickness Tc of the center portion become substantially equal. Accordingly, an image to be observed also becomes substantially flat as shown in FIG. 16C. In this case, the ratio Wr/Tc between the corner wedge amount Wr and the wall thickness Tc of the center portion of the panel is set to not more than 0.8.

Further, since the thickness of the peripheral portion of the face panel can be decreased, the image can easily obtain the high brightness so that the uniformity of the brightness over the whole screen can be enhanced. Further, when the shadow mask material of this embodiment is applied to the tension mask shown in FIG. 15A, the curved surface can be formed such that the radius of curvature in the horizontal direction is increased and hence, the radius of curvature of the inner surface of the face panel in the horizontal direction can be also increased. Accordingly, in the same manner as the constitution shown in FIG. 16B, the thickness of the peripheral portion of the face panel can be decreased so that the brightness characteristics of the display screen can be enhanced.

Further, with respect to the tension mask shown in FIG. 15A, since the color selection apertures are formed like dotted lines continuously extending in one direction, there may be a case that dotted-line-like grids which connect dotted-line-like color selection apertures vibrate due to an impact or the like. Accordingly, to prevent this vibration, a thin wire is mounted on the outside of the curved surface of the tension mask along the long axis (X axis) However, by applying the composite gradient alloy material according to the present invention to the tension mask, since the material strength of the composite gradient alloy material is considerably strong compared to the conventional Invar material, it is unnecessary to particularly mount the wire for preventing the vibration.

As has been described above, it is possible to make the press mask become substantially flat so that a suitable design can be carried out by making the inner surface of the face panel also substantially flat. Accordingly, it is possible to reduce the reflection light from the inner surface of the panel caused by the difference of wall thickness between the center portion and the peripheral portion of the panel shown in FIG. 14B without requiring reflection prevention means such as an inner surface filter film or the like. Further, since the peripheral portion of the face panel can be made thin by making the inner surface of the panel substantially flat, the panel can be made light-weighted and the manufacturing cost of the color cathode ray tube can be reduced.

Further, also with respect to the color cathode ray tube using the so-called tension mask to which the tension is applied in one direction (generally in the vertical direction), the radius of curvature of the inner surface in the direction (generally in the horizontal direction) perpendicular to one direction of the face panel to which the present invention is applied can be increased and hence, the wall thickness of the peripheral portion of the panel can be made thin whereby the reflection light from the inner surface of the panel can be suppressed, the panel can be made light-weighted, and the manufacturing cost of the color cathode ray tube can be reduced.

Further, by setting the average radius of curvature Ry of the pressed mask of this embodiment shown in FIG. 16A along the short axis (Y axis) to not less than 10000 mm, in place of the tension mask, the pressed mask of this embodiment can be applied to the face panel which has the inner surface thereof shown in FIG. 15B formed in a cylindrical surface shape and increases the radius of curvature of the inner surface thereof in the long axis (X axis) direction.

Further, the shadow mask material of this embodiment is formed of the composite gradient alloy plate. This enables the design which can suitably correct the partial doming of the curved surface of the mask, for example, the local thermal deformation due to the window pattern display by adjusting the physical quantity such as thermal expansion coefficients, the hardness, the elastic modulus of one side and the other side of the shadow mask.

The conventional shadow mask structural body has performed the correction of the doming of a curved surface of a mask caused by the impingement of electron beams and the thermal expansion of a mask frame caused by the elevation of the ambient temperature by using suspension springs mounted on the mask frame. In this embodiment, since the skirt portions of the shadow mask also adopt the multi-layered structure made of three or more layers, the correction of the above-mentioned thermal deformation or the like can be performed by the shadow mask structural body per se.

Accordingly, it is sufficient to specify the design of the suspension springs only with respect to the correction of the thermal expansion of the mask frame so that the tolerance of design of the whole shadow mask structural body can be enhanced. As a result, it is possible to provide a color cathode ray tube having high brightness and high definition which is operable also in the high current region in which the doming correction has been impossible conventionally.

Although this embodiment has been explained with respect to the case in which the nickel-iron alloy material which uses iron as the base material and contains nickel as the alloy element is used as the composite gradient alloy plate, the composite gradient alloy plate is not limited to such an alloy material. That is, this embodiment can be performed in the same manner by using an iron alloy material which contains chromium or nickel and chromium, for example, various kinds of stainless steel, an iron alloy which contains silicon or other alloy element.

Further, in the above-mentioned embodiment, the content of the same alloy element (for example, nickel) is changed with respect to the respective layers. However, the present invention is not limited to such a constitution. That is, the composite gradient alloy plate may be constituted such that different alloy elements are used in respective layers, wherein the content of the alloy element of respective layers may be gradually decreased from one surface of a plate body to the other surface of the plate body or alternatively is gradually increased from one surface of a plate body to the other surface of the plate body.

Figure 17:
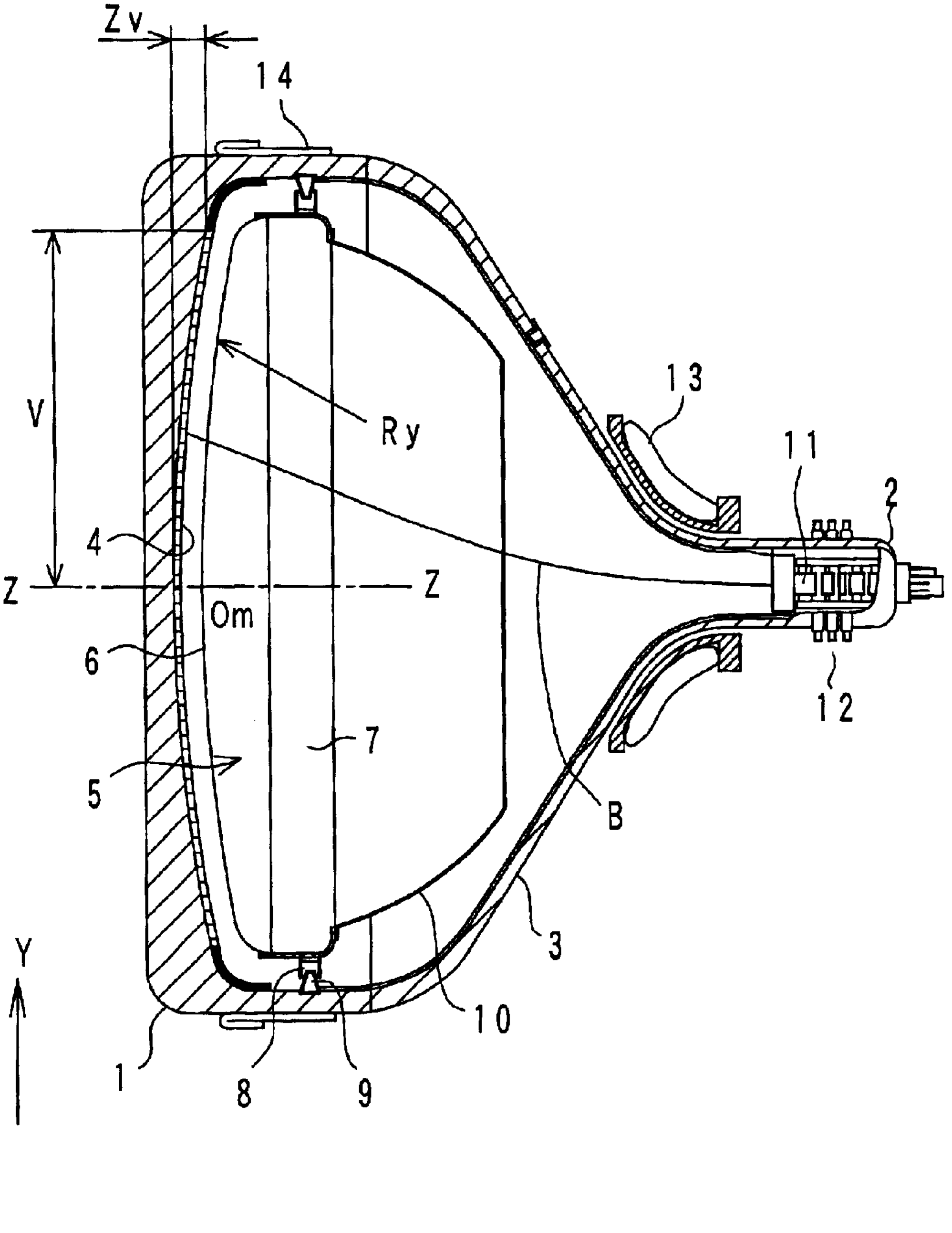
FIG. 17 is a schematic cross-sectional view for explaining one example of the whole constitution of a color cathode ray tube of the present invention.

FIG. 17 is a schematic cross-sectional view for explaining one example of the whole constitution of the color cathode ray tube of the present invention. This color cathode ray tube includes an evacuated envelope which is comprised of a panel (face panel) 1 which is coated with phosphor of a plural colors on an inner surface thereof, a neck 2 which houses an electron gun 11 and a funnel 3 having an approximately funnel shape which connects the panel 1 and the neck 2.

The phosphor 4 of three colors is coated on the inner surface of the panel 1 and the shadow mask 6 which has a large number of color selection apertures is installed close to the phosphor 4. Numeral 5 indicates a shadow mask structural body. The shadow mask 6 which constitutes the shadow mask structural body includes a large number of electron beam apertures which are formed by etching the composite gradient alloy plate and is fixedly secured to a mask frame 7 by welding.

The shadow mask 6 is curved with large radii of curvature in the horizontal direction as well as in the vertical direction. Assuming an axis which is perpendicular to a short axis (Y axis an arrow Y direction in the drawing) of an approximately rectangular apertured region of the shadow mask 6 and passes the center Om of the apertured region to be the Z axis (the tube axis) and a falling amount in the Z axis direction from the center Om of the apertured region at an arbitrary point (x, y) in the apertured region of the shadow mask 6 to be Zm, a curved shape of the shadow mask 6 can be generally defined by a following equation.

$$Zm=A1x^2+A2x^4+A3y^2+A4y^4+A5x^2y^2+A6x^2y^4+A7x^4y^2+A8x^4y^4$$ (A1 to A8: coefficient)

Then, a desired curved shape can be obtained by determining the coefficients A1 to A8 in the equation. Although the above-mentioned curved shape is defined by taking the shadow mask 6 as an example, the curved shape of the effective screen region of the panel 1 may be also defined in the same manner.

The curved surface expressed by the above-mentioned definition equation is an aspherical shape in many cases and hence, the radii of curvature thereof are different depending on arbitrary positions of the curved surface. Accordingly, the curvature (radius of curvature) of the shadow mask can be defined by a following equation by assuming such a curvature to be an average radius of curvature described in FIG. 16A.

$$Ry=(Zv^2+V^2)/2Zv$$

wherein Ry indicates an average radius of curvature (mm) along the short axis (Y axis) of the apertured region, V indicates a distance (mm) in the direction perpendicular to the Z axis from the center Om of the apertured region to the end portion along the Y axis, and Zv indicates a fall amount (mm) in the Z axis direction between the center Om of the apertured region and the end portion along the Y axis. Although the above-mentioned average radius of curvature is defined along the short axis (Y axis) of the apertured region of the shadow mask as an example, the average radius of curvature can be defined along the long axis (X axis) or along the diagonal line in the same manner. Further, the average radius of curvature can be defined in the same manner with respect to the effective screen region of the panel 1.

A magnetic shield 10 is fixedly secured to an electron-gun-side of the mask frame 7, while the mask 7 is suspended and held by stud pins 9 which are mounted in a protruding manner on an inner wall of a skirt portion of the panel 1 by way of the suspension springs 8. A deflection yoke 13 is exteriorly mounted on a neck side of the funnel 3 and deflects three electron beams B irradiated from the electron gun 11 in the horizontal direction as well as in the vertical direction (an arrow Y direction in the drawing) so as to form an image on the phosphor screen 4. In the drawing, numeral 12 indicates a magnetic correction device for the purity correction, the convergence correction or the like, and numeral 14 indicates an implosion prevention band.

With the provision of the color cathode ray tube having such a constitution, the color image display of high brightness and high definition which can suppress the color slurring caused by doming of the curved surface of the shadow mask can be obtained.

Figure 18:
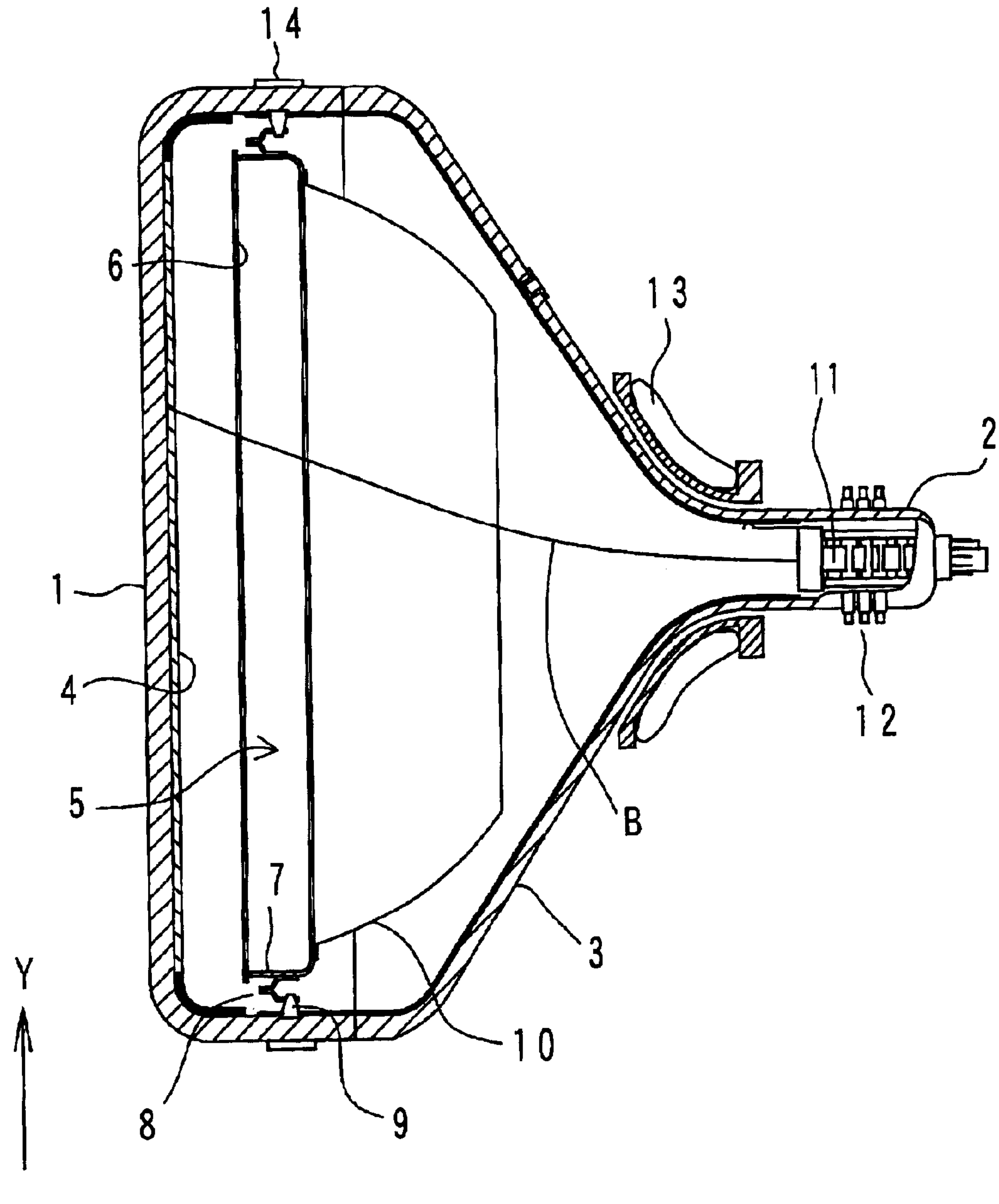
FIG. 18 is a schematic cross-sectional view for explaining another example of the whole constitution of a color cathode ray tube of the present invention.

FIG. 18 is a schematic cross-sectional view for explaining another embodiment of the whole constitution of a color cathode ray tube of the present invention. In the drawing, numerals which are equal to the numerals used in FIG. 17 correspond to identical functional parts. This color cathode ray tube includes an evacuated envelope which is comprised of a panel 1 having an inner surface on which phosphor of a plurality of colors is coated, a neck 2 housing an electron gun 11 and an approximately funnel-shaped funnel 3 which connects the panel 1 and the neck 2. However, in this embodiment, the inner surface of the panel 1 has a large radius of curvature in the horizontal direction and an infinite radius of curvature in the vertical direction (an arrow Y direction in the drawing).

The shadow mask 6 which constitutes a color selection electrode installed in the color cathode ray tube has a large radius of curvature in the horizontal direction and has a radius of curvature in the vertical direction which is considerably larger than the radius of curvature in the horizontal direction or is infinite. The shadow mask 6 is fixedly secured to the mask frame 7 while being applied with tension. However, the shadow mask 6 may be fixedly secured to the mask frame 7 in the state that the shadow mask 6 holds a shape thereof by itself without being applied with tension.

Even when the shadow mask 6 is fixedly secured to the mask frame 7 in the state that the shadow mask 6 holds the shape thereof by itself without being applied with tension, the doming derived from the partial or the whole thermal deformation can be corrected by the thermal deformation compensation function of the shadow mask and the color slurring or the like can be reduced whereby the color image display of high brightness and high definition can be obtained.

Further, the application of the composite gradient alloy plate according to the present invention which remains the internal stress therein is not limited to the above-mentioned shadow mask of the color cathode ray tube. That is, the composite gradient alloy plate according to the present invention can be applied to various types of parts of other electronic equipment formed by press machining. Particularly, by applying the composite gradient alloy plate according to the present invention to the parts or the like which are subjected to press machining, the parts can exhibit the excellent resistance against deformation of shape and the excellent resistance against deformation by heat. Further, the application of the composite gradient alloy plate according to the present invention is not limited to the above-mentioned electronic parts or the like. That is, the composite gradient alloy plate can be applied to structures which require rigidity such as vehicles including automobiles and electric trains, decks of ships, bridges, structures including various tunnel interiors and the like so as to make these structures exhibit the excellent resistance against deformation of shape and the excellent resistance against deformation by heat.

As has been explained heretofore, according to the typical constitutions of the present invention, the material of the shadow mask which constitutes the color selection electrode does not contain the expensive metal element such as cobalt or the like or the content thereof is set to a minimum amount. Further, it is possible to adopt the material which does not contain nickel or the like in one surface side. Accordingly, the material cost can be reduced compared with the conventional Invar material, the etching property in forming the electron beam apertures can be enhanced, and the electron beam apertures can be etched in a proper shape due to the ratio of the alloy region in the composite gradient alloy plate so that the electron beam apertures having the uniform cross-sectional shape can be formed.

Further, since the nickel content can be reduced as a whole, the magnetic characteristics are enhanced, the shield effect of the earth magnetism is enhanced, the strength of the shadow mask material made of the thin plate is largely increased so that the occurrence of the doming derived from the partial or whole thermal deformation can be reduced whereby it is possible to provide the color cathode ray tube of high brightness and high definition while having the thin face panel.

Further, by applying the composite gradient alloy plate according to the present invention to structures which require rigidity such as electronic parts, vehicles including automobiles and electric trains, decks of ships, bridges, structures including various tunnel interiors and the like, it is possible to provide a metal plate material which can suppress the deformation of shape and the deformation by heat.

What is claimed is:

1. A composite gradient alloy plate having a plurality of constituent layers which are laminated while continuously changing the concentration of an alloy element in an iron-alloy plate containing the alloy element in iron in the thickness direction of the iron-alloy plate, wherein an internal stress is made to remain in the composite gradient alloy plate such that a tensile stress and a compressive stress which remain in the planar direction of the composite gradient alloy plate at boundary regions of the plurality of constituent layers are directed in opposite directions from each other.

2. A composite gradient alloy plate according to claim 1, wherein the plurality of constituent layers are formed of three layers consisting of one surface layer, an other surface layer, and an intermediate layer which is laminated between the one surface layer and the other surface layer.

3. A composite gradient alloy plate according to claim 2, wherein the tensile stress remains in the one surface layer and the other surface layer, while the compressive stress remains in the intermediate layer.

4. A composite gradient alloy plate according to claim 2, wherein the compressive stress remains in the one surface layer and the other surface layer, while the tensile stress remains in one the intermediate layer.

5. A composite gradient alloy plate according to claim 2, wherein the concentration distributions of the alloy element in the planar direction differ among the plurality of constituent layers.

6. A composite gradient alloy plate according to claim 3, wherein the concentration distribution of the alloy element in the planar direction differ among the plurality of constituent layers.

7. A composite gradient alloy plate according to claim 1, wherein the alloy element is nickel.

8. A composite gradient alloy plate according to claim 2, wherein the alloy element is nickel.

9. A composite gradient alloy plate according to claim 3, wherein the alloy element is nickel.

10. A composite gradient alloy plate according to claim 4, wherein the alloy element is nickel.

11. A composite gradient alloy plate according to claim 5, wherein the alloy element is nickel.

12. A composite gradient alloy plate according to claim 6, wherein the alloy element is nickel.

13. A method for manufacturing a composite gradient alloy plate having a plurality of constituent layers which are laminated while continuously changing the concentration of an alloy element in an iron-alloy plate containing the alloy element in iron in the thickness direction of the iron-alloy plate, the method comprising:

a step in which a plurality of molten materials which differ in the content concentration of the alloy element are merged by hot rolling thus forming a base material for composite gradient alloy plate having a plurality of constituent layers which differ in thermal expansion due to the continuous change of the concentration of the alloy element, a heating step in which the temperature of the base material for composite gradient alloy plate is elevated from a normal temperature to a temperature at which the constituent layers is displaced by an amount equal to or more than an elastic limit of the constituent layer of low thermal expansion thus alleviating an internal stress of the constituent layer of low thermal expansion, and a step in which, after completing the heating, the temperature of the base material for composite gradient alloy plate is made to return to the normal temperature so as to make the constituent layer of low thermal expansion generate a compressive stress and also to make the constituent layer of high thermal expansion generate a tensile stress based on the compressive stress generated in the constituent layer of low thermal expansion, whereby the internal stress is made to remain in the base material for composite gradient alloy plate.

* * * * *